(12) United States Patent
Tin et al.

(10) Patent No.: US 9,664,507 B2
(45) Date of Patent: May 30, 2017

(54) DEPTH VALUE MEASUREMENT USING ILLUMINATION BY PIXELS

(71) Applicant: CANON KABUSHIKI KAISHA, Tokyo (JP)

(72) Inventors: Siu-Kei Tin, Milpitas, CA (US); Mahdi Nezamabadi, San Jose, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 247 days.

(21) Appl. No.: 14/489,008

(22) Filed: Sep. 17, 2014

(65) Prior Publication Data
US 2016/0076878 A1    Mar. 17, 2016

(51) Int. Cl.
| | |
|---|---|
| H04N 7/18 | (2006.01) |
| G01B 11/22 | (2006.01) |
| H04N 5/235 | (2006.01) |
| G06T 7/521 | (2017.01) |

(52) U.S. Cl.
CPC ............. *G01B 11/22* (2013.01); *G06T 7/521* (2017.01); *H04N 5/2351* (2013.01)

(58) Field of Classification Search
CPC .................................................. H04N 5/2351
USPC .......................................................... 348/135
See application file for complete search history.

(56) References Cited

U.S. PATENT DOCUMENTS

| | | | |
|---|---|---|---|
| 6,580,405 B1* | 6/2003 | Yamazaki | G06F 3/011 345/103 |
| 8,081,840 B2 | 12/2011 | Laurent | |
| 8,134,555 B2 | 3/2012 | Debevec et al. | |
| 8,532,448 B1 | 9/2013 | Andle et al. | |
| 8,648,907 B2 | 2/2014 | Kanamori | |
| 2002/0067474 A1* | 6/2002 | Uomori | G01S 7/4815 356/3.01 |
| 2006/0114403 A1* | 6/2006 | Kang | G02F 1/1309 349/144 |
| 2006/0176541 A1* | 8/2006 | Woodgate | G02B 27/2214 359/237 |
| 2008/0130015 A1* | 6/2008 | Lu | G01B 11/25 356/610 |
| 2010/0074521 A1* | 3/2010 | Gomi | H04N 13/0018 382/167 |
| 2011/0311107 A1 | 12/2011 | Levesque | |
| 2012/0081775 A1* | 4/2012 | Ersman | G02F 1/155 359/270 |
| 2012/0169635 A1* | 7/2012 | Liu | G06F 3/0412 345/173 |

(Continued)

OTHER PUBLICATIONS

Ihrke, et al. "Transparent and Specular Object Reconstruction", Computer Graphics Forum, vol. 29, No. 8, pp. 2400-2426 (2010).

(Continued)

*Primary Examiner* — Leron Beck
(74) *Attorney, Agent, or Firm* — Fitzpatrick, Cella, Harper & Scinto

(57) ABSTRACT

A depth value is measured. An image is captured of an object illuminated by one or more light patterns effected by multiple pixel-layers. Each pixel-layer includes an array of pixels. A direction of incoming illumination is determined for a specular reflection at a point on the surface of the object. The depth value of the point on the surface of the object is determined based on the captured image and the direction of incoming illumination.

18 Claims, 18 Drawing Sheets

(56) References Cited

U.S. PATENT DOCUMENTS

| | | | |
|---|---|---|---|
| 2012/0212793 A1* | 8/2012 | Andersson Ersman | G02F 1/1533 359/268 |
| 2012/0237112 A1 | 9/2012 | Veeraraghavan et al. | |
| 2013/0301908 A1* | 11/2013 | Shim | G06T 5/005 382/154 |
| 2014/0267185 A1* | 9/2014 | Arends | G06F 3/03545 345/179 |
| 2015/0253428 A1* | 9/2015 | Holz | G01S 17/42 356/5.01 |

OTHER PUBLICATIONS

Francken, et al., "Gloss and Normal Map Acquisition of Mesostructures Using Gray Codes", Hasselt University, pp. 1-9. (2009).

Francken, et al. "High Quality Mesostructure Acquisition Using Specularities", Hasselt University, pp. 1-6 (2008).

Aittala, et al., "Practical SVBRDF Capture in the Frequency Domain", ACM Transactions on Graphics 32(4) (Proc. SIGGRAPH 2013), pp. 1-12 (2013).

* cited by examiner

STACK OF PIXEL-LAYERS

EMBODIMENTS OF PIXEL-LAYERS

DEPTH VALUE MEASUREMENT USING ILLUMINATION BY PIXELS

FIELD

The present disclosure relates to measurement of depth values, and more particularly relates to measurement of a depth value of a point on a surface of an object using illumination by pixels.

BACKGROUND

Objects fabricated from a highly glossy material have reflection characteristics that differ significantly from those fabricated from a diffuse material. For example, whereas for a diffuse material light from a directional light source such as a projector is reflected in virtually all directions, for a highly glossy material, such light is reflected in primarily only one direction or at most only a few directions. These reflections are called "specular" reflections, and are caused by the shiny surface of the glossy material, which often has a mirror-like surface finish. As a consequence, an image of a highly glossy object illuminated by a directional light source is often completely dark, unless the camera is positioned at the precisely correct viewing direction so as to capture the specular reflection.

SUMMARY

Techniques exist for addressing the difficulty of specular reflection discussed above. One technique is to use an array of diffuse point light sources densely populating an angular range. Such technique would not, however, uniquely identify the direction of incoming illumination causing the specular reflection without knowledge of depth, a phenomenon sometimes known as the "depth-normal ambiguity". One solution to this ambiguity is to move the point light sources or the camera and thereafter obtain a second image capture. Such techniques are disadvantageous, however, since movement of system parts requires re-calibration. Another solution is to use far-field illumination, in which the point light sources are positioned such that their distances relative to the object is large compared to the scale of the object. Such a technique is disadvantageous since the resulting measurement system is relatively large.

The foregoing situation is addressed by capturing an image of an object illuminated by one or more light patterns effected by multiple pixel-layers. Each pixel-layer includes an array of pixels. A direction of incoming illumination is determined for a specular reflection at a point on the surface of the object. The depth value of the point on the surface of the object is determined based on the captured image and the direction of incoming illumination.

Thus, in an example embodiment described herein, a surface profile of an object is measured. Multiple images are captured of the object illuminated by light patterns from multiple pixel-layers whose pixels act as near-field diffuse point light sources. A direction of incoming illumination is disambiguated for each of multiple specular reflections in the captured images. The surface profile of the object is determined based on the captured images and the disambiguated direction of incoming illumination.

Because of this arrangement, it is ordinarily possible to determine a surface profile or depth map of a highly specular object with a measurement system which is relatively compact, and which does not require re-calibration and movement during measurement.

In another example aspect, the image is analyzed to determine the location of a pixel in each of the multiple pixel-layers that is associated with the specular reflection, and a regression line on the pixel locations determines the direction of incoming illumination for the specular reflection.

In another example aspect, the depth value of the point on the surface of the object is determined by triangulation of the direction of incoming illumination and a viewing direction for the specular reflection captured in the image.

In still another example aspect, a surface normal vector is estimated for each of a plurality of points on the surface from the direction of incoming illumination for the specular reflection at each point and a viewing direction for the specular reflection captured in the image, and the depth value is determined by determining a surface profile function whose normal derivatives best fit the estimated surface normal vectors. In one aspect, the surface normal vector is estimated as a bisecting vector between the direction of incoming illumination and the viewing direction.

In yet another example aspect, the one or more light patterns result from one or more coded patterns transmitted to the pixel-layers.

In one aspect, each of the one or more coded patterns is a bitplane of a binary code, and the location of a pixel in each of the multiple pixel-layers that is associated with the specular reflection is determined by matching a binarized value of the captured image to a binary code bit value.

In another aspect, each of the one or more coded patterns is phase-shifted relative to a sinusoidal pattern, and the location of a pixel in each of the multiple pixel-layers that is associated with the specular reflection is obtained by recovering a phase angle associated with the pixel from the captured image.

In yet another example aspect, each pixel-layer is associated with a color, and each pixel is capable of at least two states of which one state corresponds to a white color and the other state corresponds to a color complementary to the associated color of the pixel-layer to which the pixel belongs, and the transmitted coded pattern for the pixel-layer corresponds to a binary coded pattern in the at least two states. In yet another example aspect, the associated colors for the pixel-layers are mutually relatively distinct, and the captured image is in multiple color channels each corresponding to a respective associated color for a pixel-layer.

In yet another example aspect, more than one coded patterns are transmitted to the multiple pixel-layers sequentially and the corresponding more than one images in a same viewing direction are captured in synchronization with the sequential transmission.

In still another example aspect, each pixel-layer successively becomes an active layer to receive a transmission of a coded pattern.

In one example aspect, multiple pixel-layers are organized in a plurality of groups, each group of which comprising multiple pixel-layers and illuminating the object in a respectively different direction.

In another example aspect, a plurality of images are captured in a respective plurality of different viewing directions.

In still another example aspect, at least one pixel-layer includes a spatial light modulator.

In yet another example aspect, at least one pixel-layer includes a semi-transparent sheet.

In another example aspect, a pixel-layer is designated as an active layer, a coded pattern of spatially varying pixel values is transmitted to the active layer, and a constant pattern of spatially non-varying pixel values is transmitted to the pixel-layers that are not the active layer.

In another example aspect, multiple pixel-layers with respective associated colors are active simultaneously and receive transmission of a coded pattern.

In still another example aspect, the multiple pixel-layers are curved so as to surround the object.

In yet another example aspect, plural groups of multiple pixel-layers are arranged so as to surround the object.

This brief summary has been provided so that the nature of this disclosure may be understood quickly. A more complete understanding can be obtained by reference to the following detailed description and to the attached drawings.

DETAILED DESCRIPTION

Figure 1:
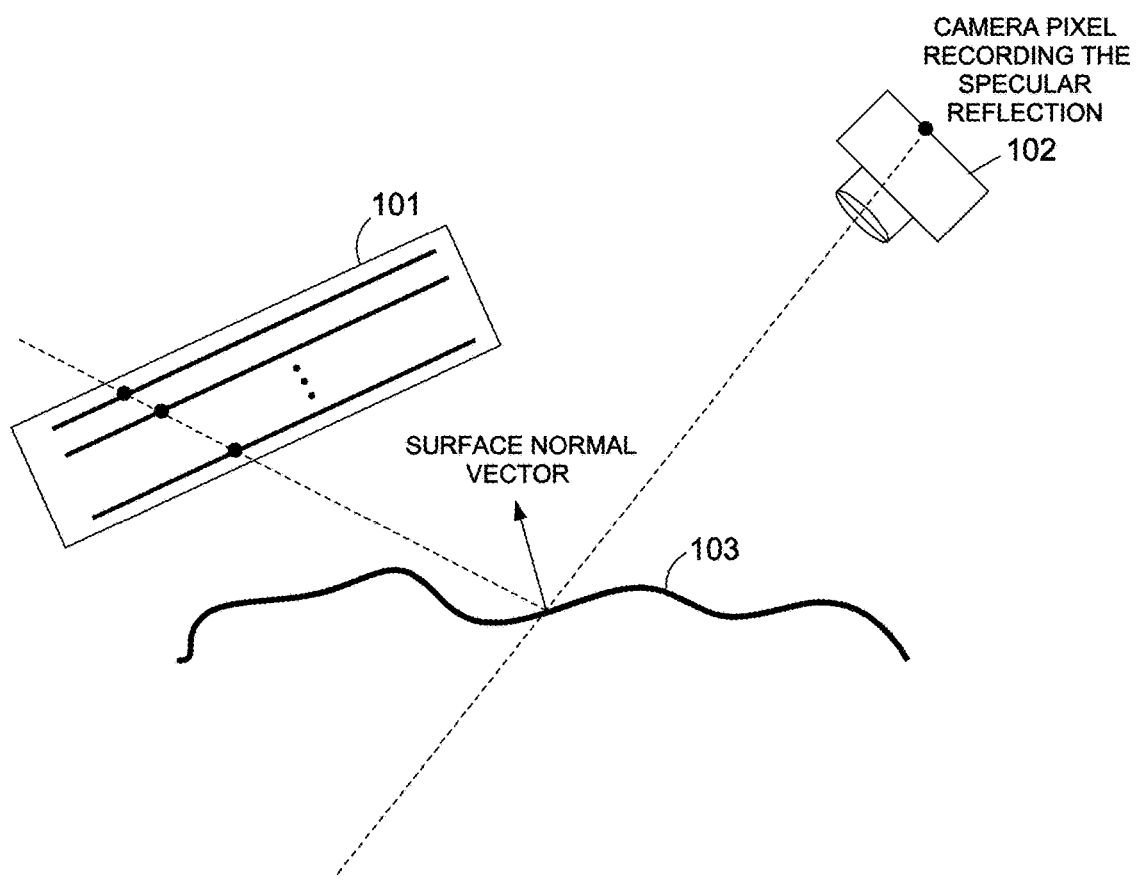
FIG. 1 illustrates an example embodiment of an environment in which aspects of the present disclosure may be practiced.

FIG. 1 illustrates an example embodiment of an environment in which aspects of the present disclosure may be practiced.

In particular, as shown in FIG. 1, illumination assembly 101, comprising multiple pixel-layers, each pixel layer including an array of pixels, effects illumination of the surface of an object 103. In that regard, as described more fully below, in some embodiments one or more pixel-layers may be luminous, whereas in other embodiments one or more pixel-layers may act as a "pass through" for light from another light source.

Meanwhile, specular reflections caused by the illumination are captured by capture device 102. For purposes of clarity, FIG. 1 depicts a single specular reflection at a point on the surface of object 103, and capture device 102 captures and records the reflection in a corresponding single camera pixel. It should be understood that such specular reflection may be occurring at multiple points on the surface of object 103 and captured in multiple camera pixels of capture device 102 at the same time. Moreover, additional embodiments may include multiple cameras, multiple or larger illumination assemblies, and the like, as discussed below.

As shown in FIG. 1, illumination with illumination assembly 101 uses N pixel-layers, where N≥2.

According to the disclosure, a light pattern results from one or more coded patterns transmitted to the pixel-layers. Meanwhile, a "pixel-layer" might include a 2D array of pixels. There is a pixel dimension associated with a layer, e.g., 1920×1080. A pixel ordinarily does not need to be self-luminous, i.e., it does not need to emit light by itself. For example, in a typical LCD display, there is a backlight source and the LCD panel modulates the backlight based on the image signal. In addition, in a color display, each pixel is capable of displaying a specified intensity or color. Example embodiments of the lighting components of the assembly, and in particular of the pixel-layers of illumination assembly 101, will be described more fully below with respect to FIGS. 5 and 6.

In one embodiment, the layers are arranged in a stack so that all the layers are parallel to each other. Other embodiments are possible and parallel layers are not a necessity as long as the pixel locations on the layers can be geometrically determined.

Although FIG. 1 specifically depicts capture device 102 as a camera, it should be understood that various other capture devices may be used.

Figure 7:
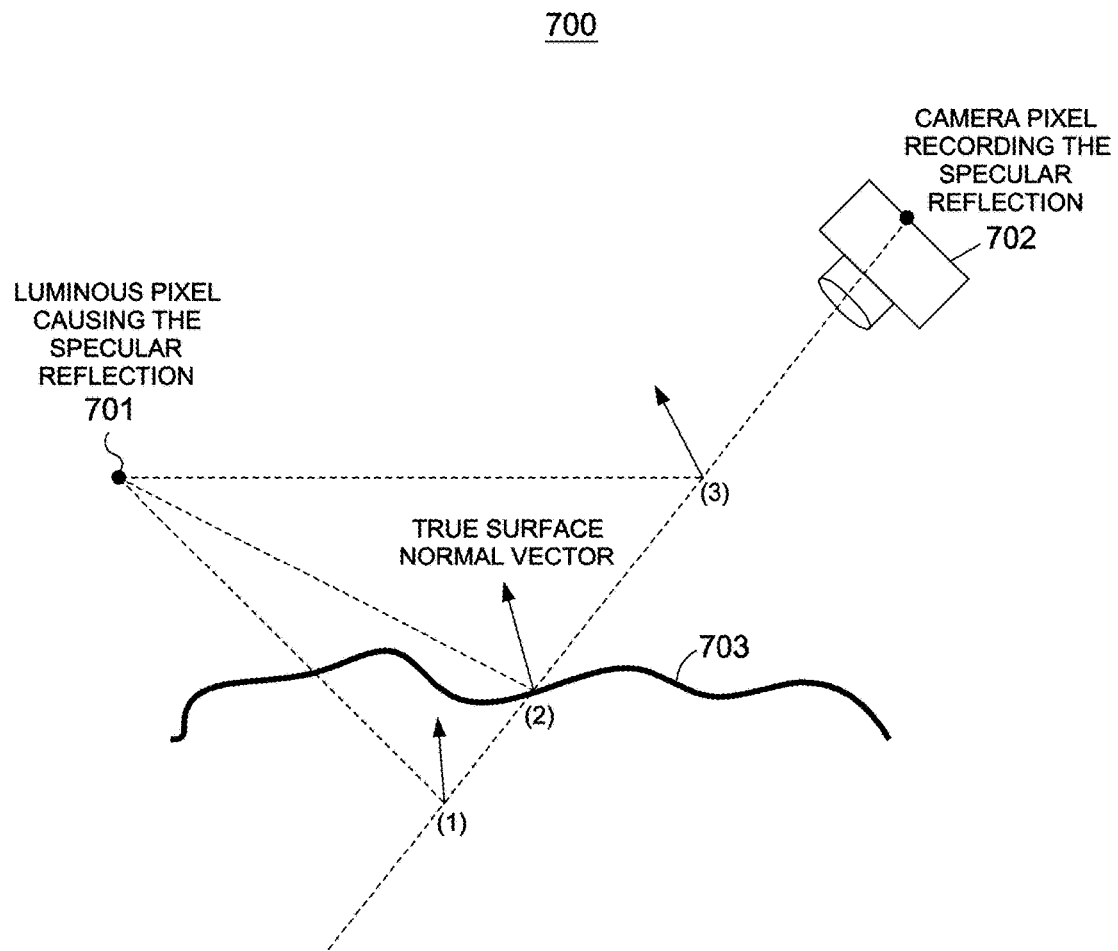
FIG. 7 is a view for explaining conventional problems with determining a surface normal vector.

In that regard, in contrast to the multiple pixel-layer assembly shown in FIG. 1 above, FIG. 7 is a view for illustrating an illumination assembly without multiple layers, and further explanation of the disadvantages thereof.

In particular, FIG. 7 depicts a luminous pixel 701, for example, of a display, a camera 702, and an object 703.

For purposes of explanation, it can be assumed in FIG. 7 that the intrinsic and extrinsic parameters of the camera 702 have already been determined through an offline geometric calibration using a calibration algorithm, and that the camera has recorded at a pixel of a capture image that has been determined to be the result of a specular reflection (such determination being described more fully below). A camera ray can be determined from the physical 3D location of the pixel and the optical center of the camera (the camera eye), both of which can be determined from the intrinsic and extrinsic parameters. The actual surface point (on the object) at which reflection occurs must lie on the camera ray, but where it is on the camera ray is not yet known. The camera ray determines the "viewing direction".

However, as shown in FIG. 7, instead of determining a unique illumination direction, there are infinitely many possibilities, three of which are shown in the figure. Only possibility (2) represents the truth. However, because the shape of the object is unknown (in fact, it is what is sought to be measured), it is not possible to determine which of (1), (2) or (3) represents the truth. In addition, for each possibility, a surface normal vector can be determined which is the half-way vector between the viewing direction and the illumination direction. This ambiguity is called the "depth-normal ambiguity".

Theoretically, to uniquely determine the illumination direction, another luminous pixel that will cause the same reflection should be found. This may be achieved by moving the display to a different position and identifying a new luminous pixel. Such an approach, however, is not desirable for several reasons. First, if the illumination display unit is moved, geometric calibration of the display must be performed after the move, which consumes time and might require removing the object being measured and placing a calibration target in the scene. Replacing the object, in turn, may create a problem of image alignment or registration. Meanwhile, if the camera is moved or a second camera is used to get additional constraints to resolve the depth-normal ambiguity, there arises a correspondence problem of pixels. The depth-normal ambiguity might be reduced if the light source is moved far away such that its distance is relatively large compared to the size of the object. However, the form factor of the resulting measurement system is relatively large. For example, it cannot be a handheld system unless the object to be measured is relatively small.

In contrast, according to the arrangement shown in FIG. 1, it is ordinarily possible to measure a depth value using a system which is relatively compact and which does not require re-calibration, by capturing an image of an object illuminated by one or more light patterns effected by multiple pixel-layers, where each pixel-layer includes an array of pixels, determining a direction of incoming illumination for a specular reflection at a point on the surface of the object, and determining the depth value of the point on the surface of the object based on the captured image and the direction of incoming illumination, as discussed more fully below.

Figure 2:
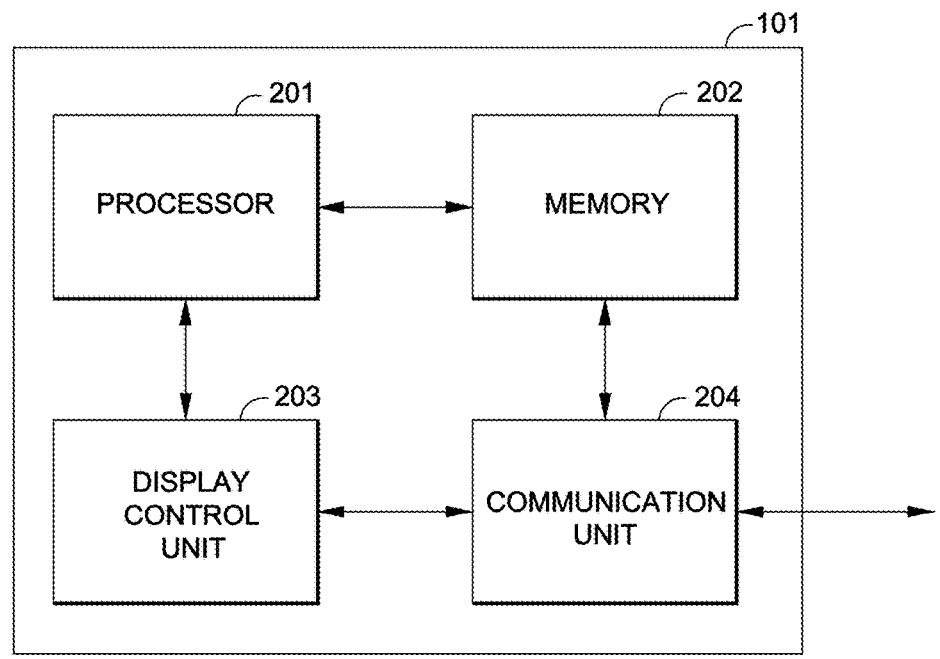
FIG. 2 is a block diagram for explaining an internal architecture of an illumination assembly according to one example embodiment.

FIG. 2 is a block diagram for explaining an internal architecture of an illumination assembly according to one example embodiment.

As shown in FIG. 2, illumination assembly 101 includes processor 201, which controls the illumination assembly 101. The processor 201 executes programs recorded in memory 202 to implement respective processes to be described later. For example, processor 201 may receive coded patterns for illumination by multiple pixel-layers from communication unit 204, and control the layers to provide such illumination via display control unit 203.

Memory 202 may be one or a combination of, for example, a non-volatile memory (e.g., a hard disk or other nonvolatile, non-transitory storage medium) a random access memory (RAM) for use as a main run-time transient memory, and a read only memory (ROM). Information stored in memory 202 is provided to processor 201 during execution of the instructions in software programs, such as an operating system, application programs, image processing modules, and device drivers. More specifically, processor 201 first loads computer-executable process steps from memory 202, and then processor 201 can execute the stored process steps in order to execute the loaded computer-executable process steps. Data, also, can be stored in memory 202 so that the data can be accessed by processor 201 during the execution of the computer-executable software programs, to the extent that such software programs have a need to access and/or modify the data.

Display control unit 303 controls the multiple pixel-layers, and the light pattern effected by one or more of the multiple pixel-layers is based on one or more coded patterns transmitted to the layer(s) from the display control unit 303. In one example, more than one coded patterns are transmitted to the multiple pixel-layers sequentially and the corresponding images in a same viewing direction are captured in synchronization with the sequential transmission. In still another aspect, each pixel-layer successively becomes an active layer to receive transmission of a coded pattern. In that regard, an "active" layer as described herein is a pixel-layer including an array of pixels as described above that is receiving a coded pattern of spatially varying pixel values. A layer that is not an active layer receives, on the other hand, a constant pattern of spatially non-varying pixel values, effectively acting as a "pass-through" for another light source.

Communication unit 304 communicates with other devices via an internal or external network such as the Internet, a Local Area Network (LAN), Wide Area Network (WAN), Metropolitan Area Network (MAN), or Personal Area Network (PAN), among others. Connection from communication unit 304 can be wired or wireless, and can be implemented, for example, via Optical fiber, Ethernet, or Wireless LAN network.

Figure 3:
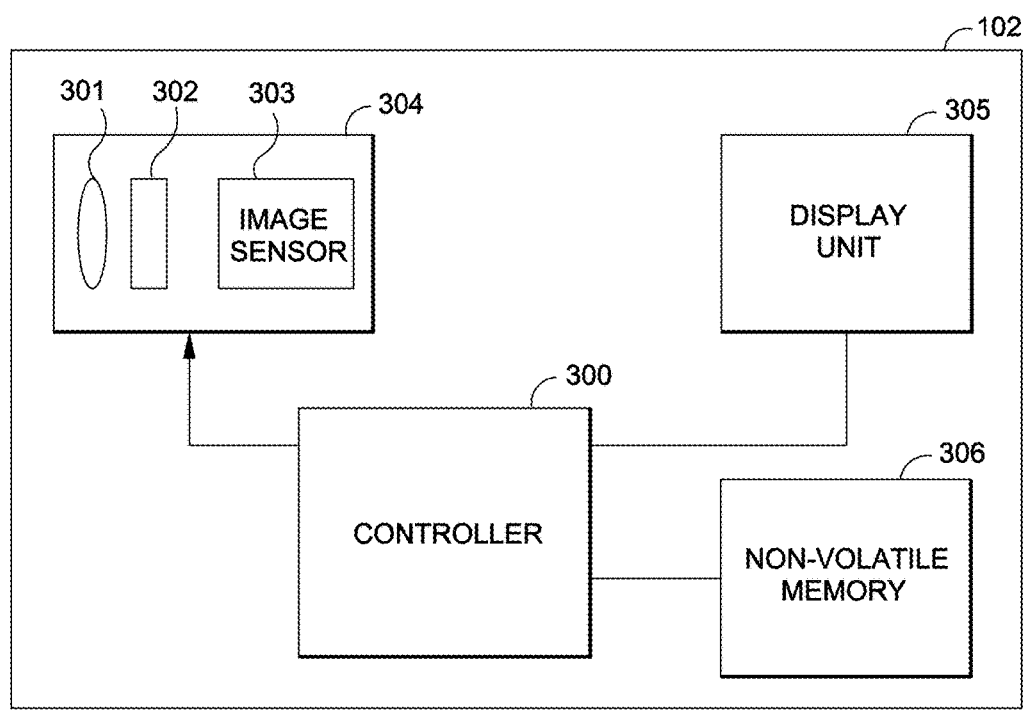
FIG. 3 is a block diagram for explaining the internal architecture of an image capture device according to one example embodiment.

FIG. 3 is a block diagram for explaining the internal architecture of the image capture device 102 shown in FIG. 1 according to one example embodiment.

As shown in FIG. 3, image capture device 102 includes controller 300, which controls the entire image capture device 102. The controller 300 executes programs recorded in non-volatile memory 306 to implement respective processes to be described later. For example, controller 300 may control the optics (e.g., lens 301 and shutter 302) and image sensor 303 in order to capture an image; it may also perform image processing tasks and output captured images to memory including non-volatile memory or transient memory (not shown) to be transmitted externally.

Capture optics for image capture device 102 comprise capture assembly 304, which includes image sensor 303, shutter 302 and lens 301.

More specifically, reference numeral 301 denotes an imaging lens; 302, a shutter having an aperture function; and 303, an image sensor, which converts an optical image into an electrical signal. A shield or barrier may cover the capture assembly 304 to prevent imaging lens 301, shutter 302 and image sensor 303 from being contaminated or damaged.

Imaging lens 301 may be of a zoom lens, thereby providing an optical zoom function. The optical zoom function is realized by driving a magnification-variable lens of the imaging lens 301 using a driving mechanism of the imaging lens 301 or a driving mechanism provided on the main unit of the image capture device 102.

Image sensor 303 converts optical signals to electrical signals. In particular, image sensor 303 may convert optical signals obtained through the imaging lens 301 into analog signals, which may then be output to an A/D converter (not shown) for conversion to digital image data. Examples of image sensors include a charge-coupled device (CCD) or a complementary metal-oxide-semiconductor (CMOS) active-pixel sensor, although numerous other types of image sensors are possible.

A light beam (light beam incident upon the angle of view of the lens) from an object that goes through the imaging lens (image sensing lens) 301 passes through an opening of the shutter 302 having a diaphragm function, and forms an optical image of the object on the image sensing surface of the image sensor 303. The image sensor 303 is controlled by clock signals and control signals provided by a timing generator which is controlled by controller 300.

Display unit 305 is constructed to display menus, thumbnail images, and a preview image. Display unit 305 may be a liquid crystal screen, although other display hardware could be used depending on environment and use.

Non-volatile memory 306 is a non-transitory electrically erasable and recordable memory, and uses, for example, an EEPROM. The non-volatile memory 306 stores constants, computer-executable programs, and the like for operation of controller 300.

Figure 4:
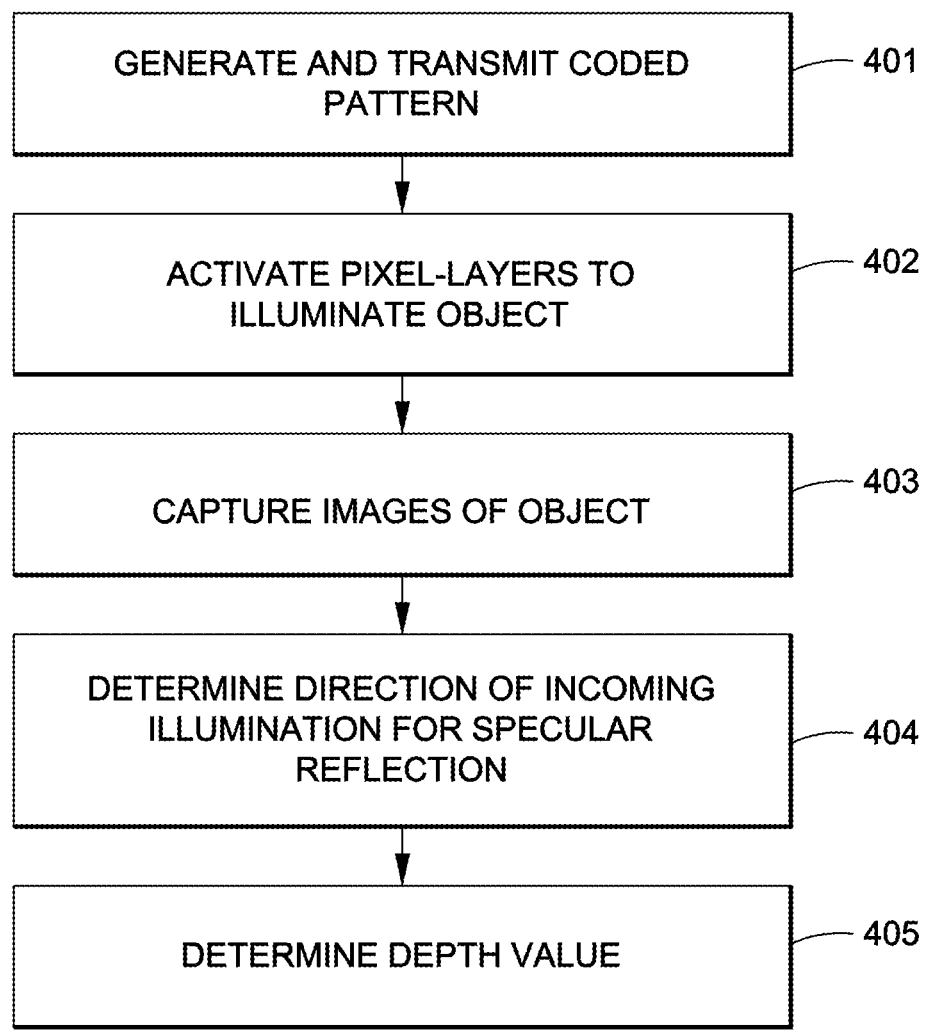
FIG. 4 is a flowchart illustrating a process for measuring a surface profile of an object according to example embodiments.

FIG. 4 is a flowchart illustrating a process for measuring a depth value of an object according to example embodiments.

Briefly, as shown in FIG. 4, a depth value is measured. An image is captured of an object illuminated by one or more light patterns effected by multiple pixel-layers. Each pixel-layer includes an array of pixels. A direction of incoming illumination is determined for a specular reflection at a point on the surface of the object. The depth value of the point on the surface of the object is determined based on the captured image and the direction of incoming illumination.

In particular, in step 401, one or more coded patterns for the light pattern are generated and transmitted to one or more pixel-layers of illumination assembly 101. In one example, a pixel-layer is designated as an active layer, a coded pattern of spatially varying pixel values is transmitted to the active layer, and a constant pattern of spatially non-varying pixel values is transmitted to the pixel-layers that are not the active layer. In step 402, the multiple pixel-layers are activated to illuminate the object in accordance with the transmitted pattern(s). In step 403, capture device 102 captures images of the illuminated object. In step 404, a direction of incoming illumination is determined for a specular reflection in an image, and in step 305, a depth value of a point on the surface of the object is determined, based on the captured image and the direction of incoming illumination. Each of these processes will be described more fully below.

Figure 5:
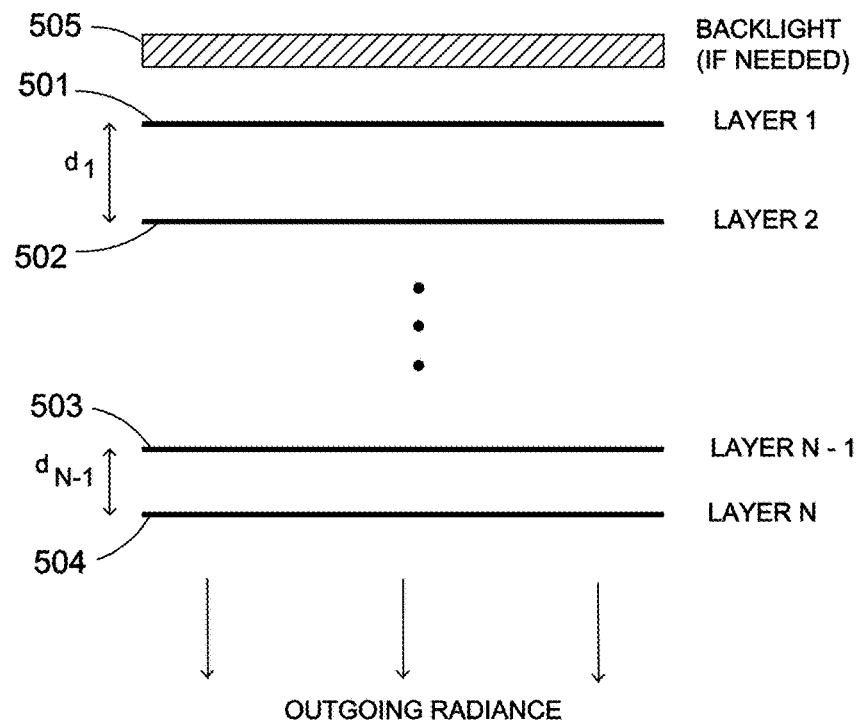
FIG. 5 is a view for explaining a stack of pixel-layers according to an example embodiment.

In that regard, FIG. 5 is a view for explaining a stack of pixel-layers according to an example embodiment. As shown in FIG. 5, layer 501 corresponds to a first layer and layer 502 to a second layer, with a distance $d_1$ between layer 501 and 502. Layer 503 corresponds to an (N−1)th layer and layer 504 to an Nth layer, with a distance $d_{N-1}$ between layers 503 and 504. Backlight 505 may be used in some embodiments to provide the light source, as described below with respect to FIG. 6. On the other hand, in some embodiments backlight 505 may be optional.

The stack in FIG. 5 may be manufactured so that the distances between the layers ($d_1$, $d_2$, . . . , $d_{N-1}$) can be predetermined with high accuracy and precision. Alternatively, the pixel-layers can be geometrically calibrated in an offline calibration process. Either way, since there is ordinarily no movement of the stack as a whole or relative movement of the layers within the stack during the online measurement process, it can be assumed that these distances and other geometric parameters are known without an online calibration step.

Figure 6:
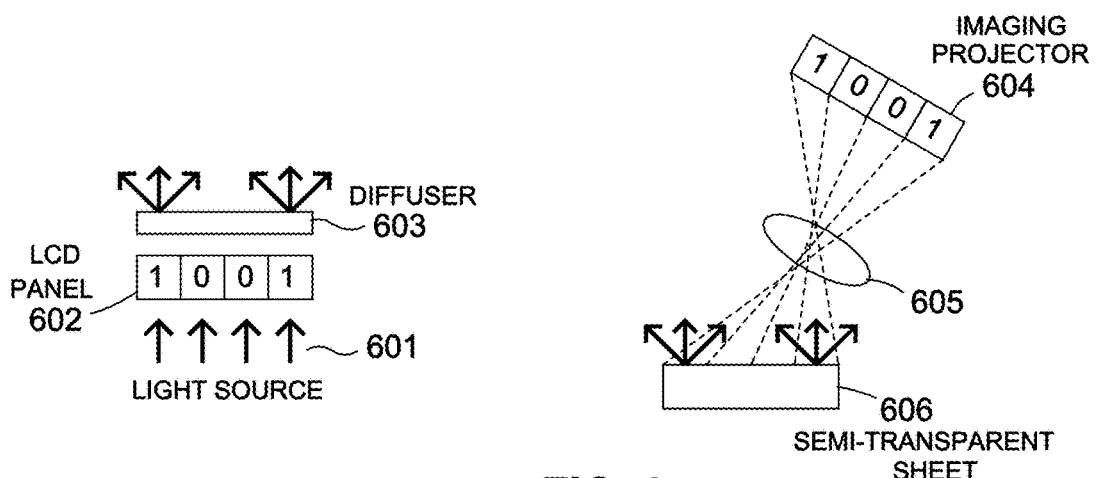
FIG. 6 is a view for explaining example embodiments of a pixel-layer.

Example physical embodiments for a pixel-layer such as 501, 502, 503 or 504 will now be described with respect to FIG. 6.

In a first embodiment, each pixel-layer, or at least one pixel-layer, is a spatial light modulator (SLM). Examples are LCD panels (such as LCD panel 602) and DMD devices. SLMs are not self-luminous, but instead modulate (change) a light source. For this embodiment, in order to create an illumination device using layers of SLMs, a light source 601 may be included (e.g., backlight 505). The LCD panel 602 has a "pass-through" state in which all the pixels are in the "on" state, i.e., logical "1" state. Equivalently, the pass-through state corresponds to a constant pattern of spatially non-varying pixel values of 1's. Ideally, in the pass-through state, LCD panel 602 is "transparent", i.e., with 100% transmittance. In practice, the transmittance may be lower than 100%, but the pass-through SLM does not alter the direction of a light beam. A diffusing layer 603 may be used in some embodiments to ensure that each pixel acts as a diffuse point light source.

In another embodiment, each pixel-layer, or at least one pixel-layer, is luminous. Such a layer can be achieved by combining an imaging projector (comprising for example an imager 604 and focusing lens 605) and a semi-transparent sheet 606. Thus, in this embodiment, at least one pixel-layer comprises a semi-transparent sheet such as semi-transparent sheet 606. In this case, pixel structure of the semi-transparent sheet 606 comes from the projector. When the projector is turned on (so that it is projecting a coded pattern), the semi-transparent sheet 606 acts as an active layer. When the projector is turned off, the semi-transparent sheet 606 acts as a pass-through layer.

An additional embodiment for a pixel-layer is an array of LEDs. Because there is no pass-through state for this embodiment, it can only be used as the first layer, for example layer 501.

When one of the layers is "active", the other layers may be in the "pass-through" state. Throughout the whole measurement process, there is ordinarily no need for mechanical movement, as the layers are simply cycled through by making one of them active at one time.

Generally, for a specular or highly glossy object, only one illumination direction can cause a reflection for a given camera pixel. This illumination direction or vector intersects the multiple pixel-layers at different points in 3D space. If at least two of these intersection points can be determined, the illumination direction can be uniquely determined. For an intersection point on a particular pixel-layer, a 3D location can be determined by transmitting a sequence of coded patterns to that layer. The technique for this determination can include, e.g., using Gray code patterns.

Figure 8:
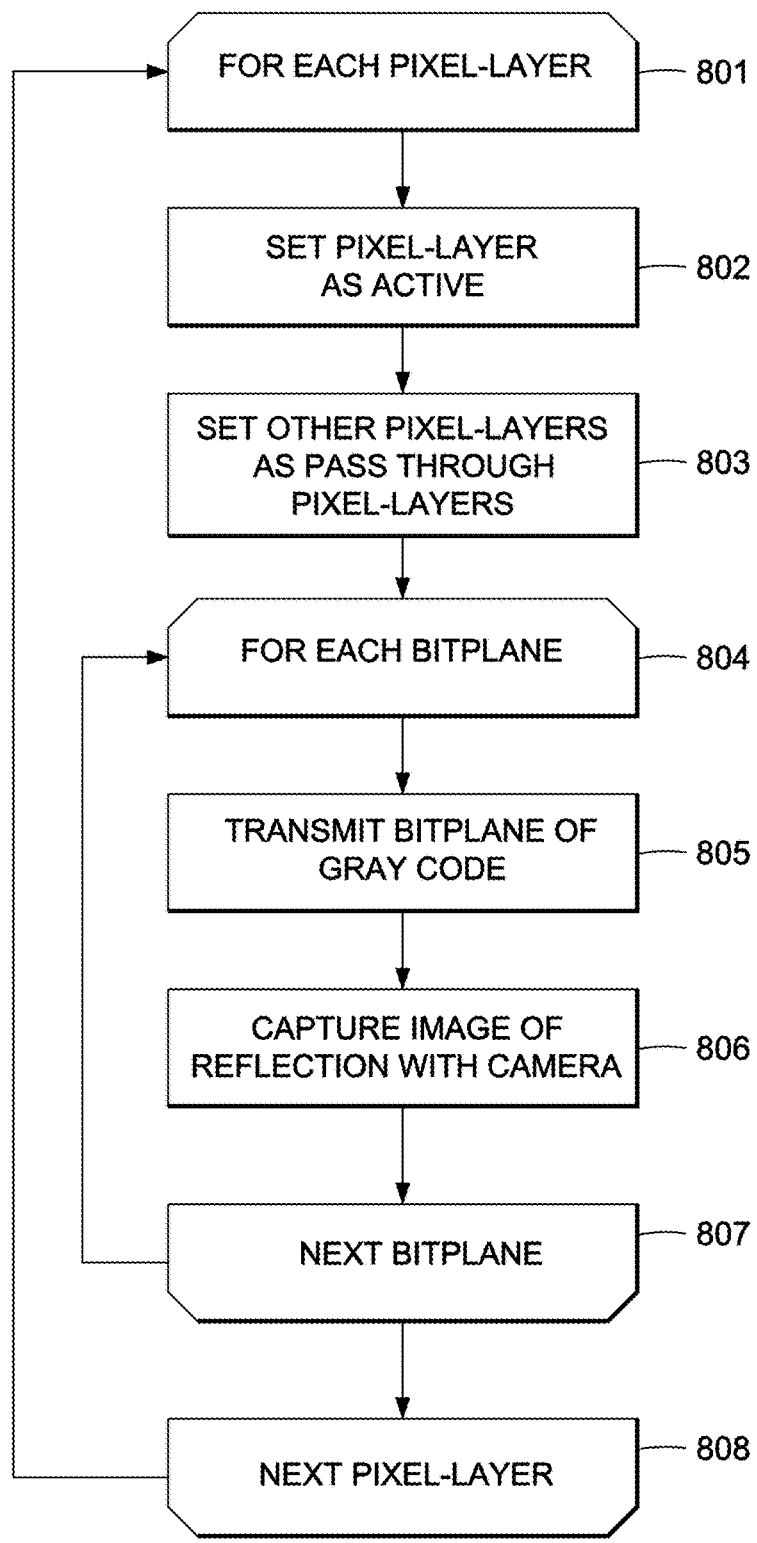
FIG. 8 is a flowchart for illustrating a capture process according to an example embodiment.

FIG. 8 is a flowchart for illustrating a capture process according to an example embodiment. In this example, the coded patterns are based on the Gray code which is a binary code.

In step 801, a process is initiated for each layer. In step 802, the current layer is set as active, and in step 803, the other layers are set as pass-through layers. A sub-process is initiated in step 804 for each bitplane. Specifically, in step 805, for the current bitplane, a bitplane of Gray code is transmitted, and an image of the reflection of the resulting light pattern is captured with a camera (or capture device, e.g., capture device 102) in step 806. The process proceeds to the next bitplane in step 807, and when all bitplanes are done, the process proceeds to the next layer in step 808.

As an example, it can be assumed that each layer has a pixel resolution of 1024×768. In this example, 10-bit Gray code can be used, with 10 bitplanes. More specifically, coded patterns of horizontal and vertical strips corresponding to the bitplanes can be transmitted, such that a total of 20 binary coded patterns will be transmitted to the active layer. For 2 layers, a total of 40 images are captured.

More generally, for a layer with pixel resolution $r_x \times r_y$, integers $M_x$ and $M_y$ are chosen such that $2^{M_x} \geq r_x$ and $2^{M_y} \geq r_y$. Then, bitplanes of $M_x$-bit Gray code for the coded patterns of vertical strips and bitplanes of $M_y$-bit Gray code for the coded patterns of horizontal strips are transmitted, resulting in a total of $(M_x+M_y)N$ binary coded patterns for all layers.

In another embodiment, the binary codes consisting of both the Gray code and their inverse code are used. The Gray code, hereinafter referred to as "direct code", gives rise to its inverse code by taking the one's complement of the direct code. In such an embodiment, a total of $2(M_x+M_y)N$ binary coded patterns will be transmitted. Continuing the example of a pixel resolution of 1024×768 and 2 layers, a total of 80 images are captured. Comparing captured images resulting from a direct binary coded pattern (i.e., a pattern corresponding to a bitplane of a direct binary code) and inverse binary coded pattern (i.e., a pattern corresponding to the same bitplane of the inverse binary code) is a robust way to binarize a captured image. For example, instead of picking an arbitrary threshold value for binarization, the captured image resulting from the inverse pattern can be used as a pixel-dependent threshold for each pixel of the captured image for the direct pattern.

Figure 9:
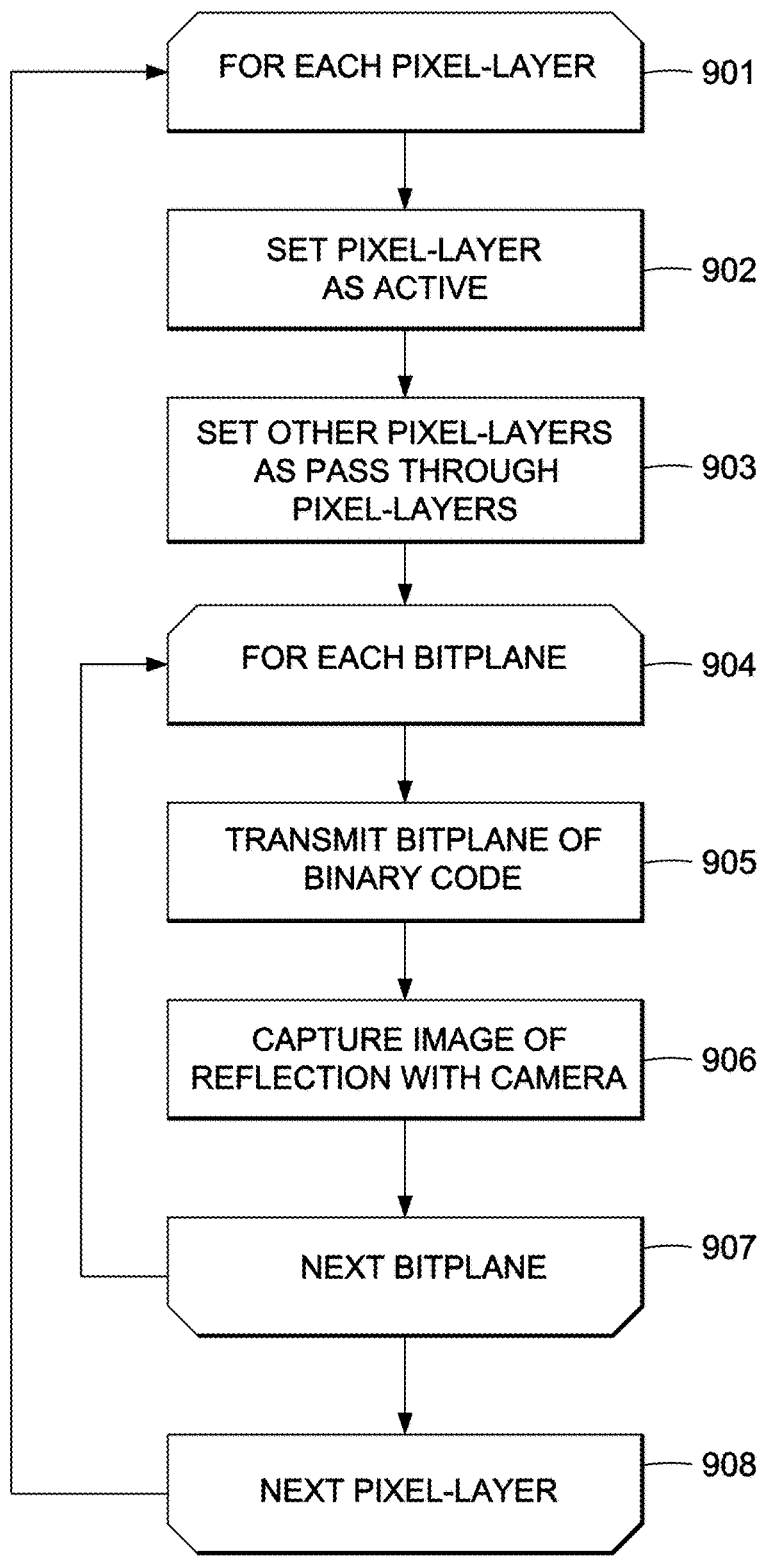
FIG. 9 is a flowchart for illustrating a capture process according to an example embodiment.

FIG. 9 is a flowchart for illustrating a capture process according to another example embodiment. In this example, instead of using binary Gray code, the coded patterns are, more generally, bitplanes of a binary code. Thus, in step 901, a process is initiated for each layer. In step 902, the current layer is set as active, and in step 903, the other layers are set as pass-through layers. A sub-process is initiated in step 904 for each bitplane Specifically, in step 905, for the current bitplane, a bitplane of binary code is transmitted, and an image of the reflection of the resulting light pattern is captured with a camera (or capture device, e.g., capture device 102) in step 906. The process proceeds to the next bitplane in step 907, and when all bitplanes are done, the process proceeds to the next layer in step 908.

Figure 10:
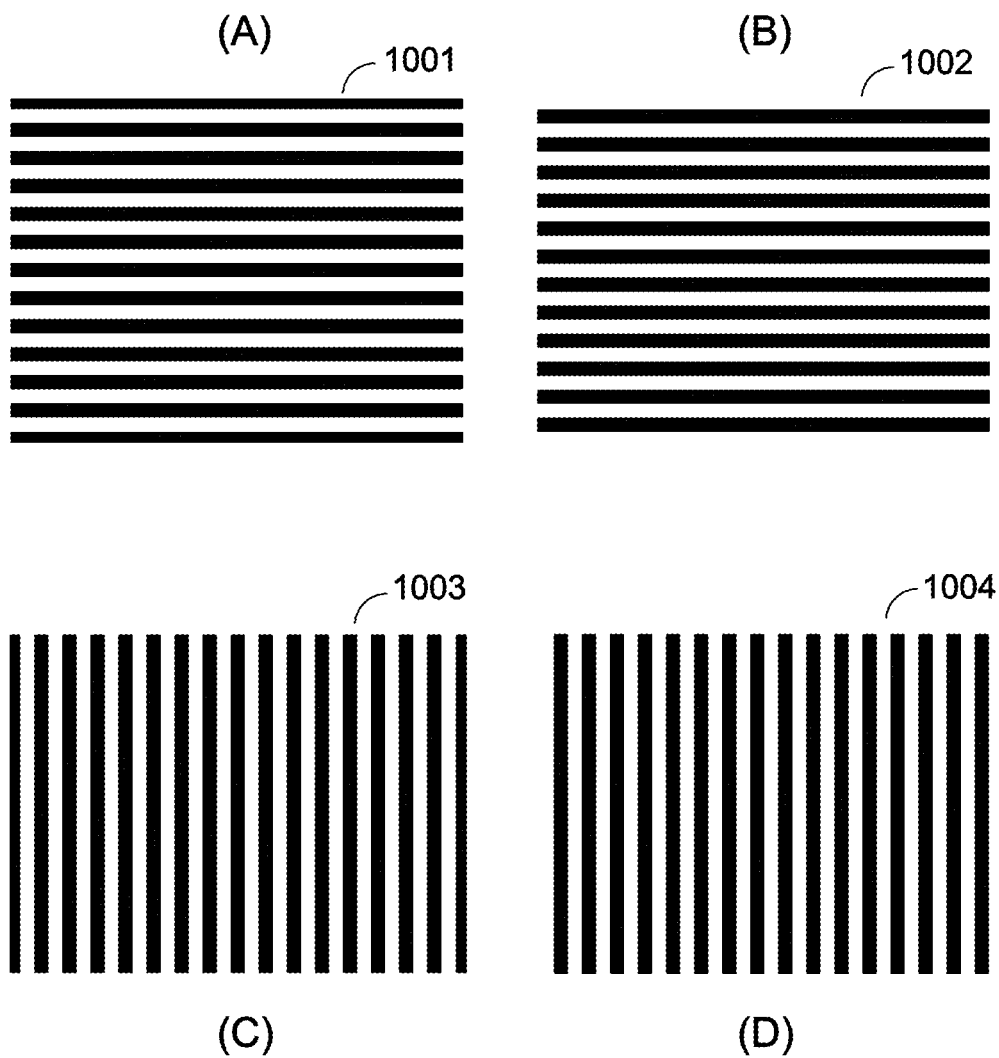
FIG. 10 is a view for explaining example binary patterns used in various embodiments.

FIG. 10 is a view for explaining example binary coded patterns used in various embodiments. In particular, codes 1001 (A) and 1003 (C) are direct coded patterns as referred to above, whereas 1002 (B) and 1004 (D) are, respectively, the corresponding inverse coded patterns. Using a set of binary coded patterns such as these, it is possible to uniquely tag any pixel on a pixel-layer. More specifically, each pixel on a pixel-layer has integer pixel coordinates (i,j), each of which can be represented as a sequence of binary digits. Thus, the pixel column at i is uniquely identified by a set of vertical binary coded patterns whereas the pixel row at j is uniquely identified by a set of horizontal binary coded patterns.

Figure 11:
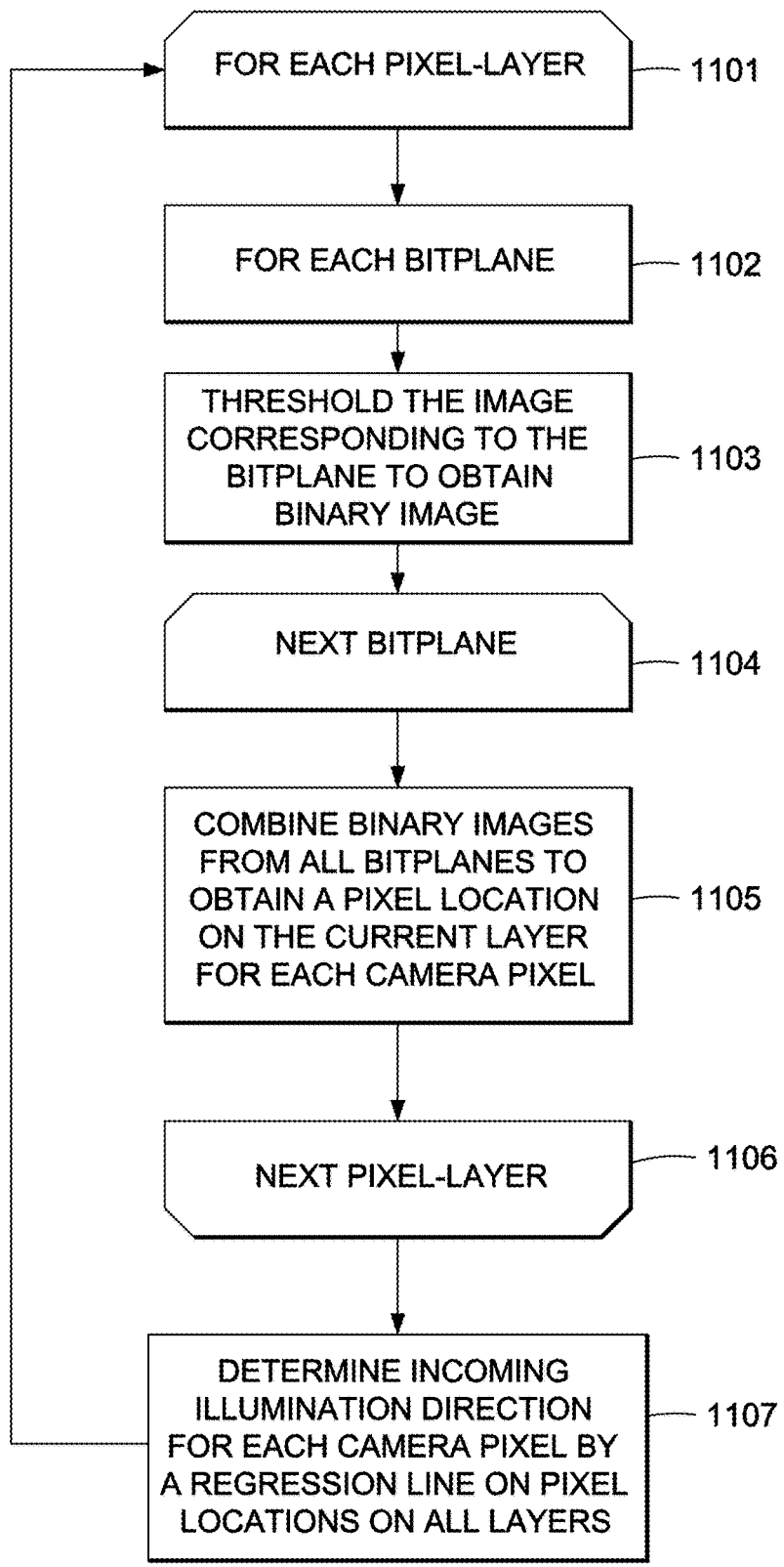
FIG. 11 is a flowchart for illustrating post-processing of captured images according to an example embodiment.

FIG. 11 is a flowchart for illustrating post-processing of captured images to recover a depth value according to an example embodiment.

In particular, in step 1101, a process is initiated for each layer, and in step 1102, a process is initiated for each bitplane in that layer.

Figure 12:
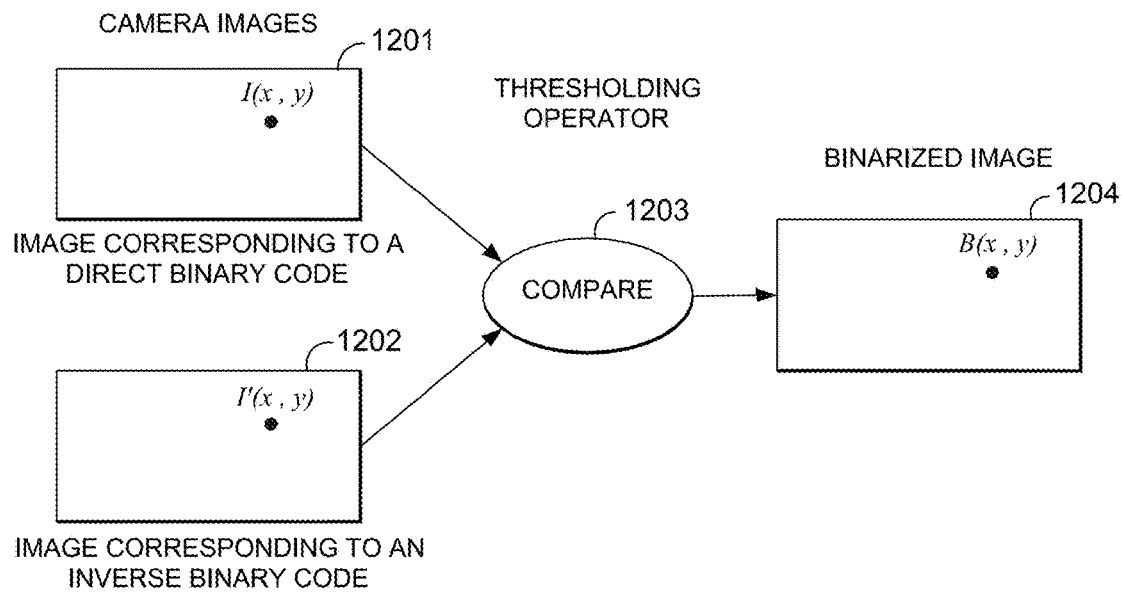
FIG. 12 is a view for explaining post-processing of captured images according to an example embodiment.

In step 1103, a captured image corresponding to the bitplane is thresholded, or binarized, to obtain a binary image. In that regard, for each captured image, it is necessary to obtain a binary image that corresponds to the binary coded pattern used on the layer. This is done by thresholding the captured image. Various embodiments of thresholding are possible. One embodiment uses both direct and inverse codes described above. In more detail, as shown in FIG. 12, the value of the binarized image at pixel location (x,y), where the pixel value of the direct image is I(x,y) and the pixel value of the inverse image is I'(x,y), is given by $$B(x, y) = \begin{cases} 1 & \text{if } I(x, y) > I'(x, y) \\ 0 & \text{if otherwise} \end{cases}.$$

This embodiment is characterized by a pixel-dependent thresholding value, where the value is provided by the value of a pixel in the image corresponding to the inverse binary code. FIG. 12 is a view for explaining this procedure, in which captured image 1201 (corresponding to a direct binary code) and captured image 1202 (corresponding to an inverse binary code) are input to a thresholding operator 1203, with the output being the binarized image 1204.

In another embodiment, the thresholding value is the same for all pixels and is learned from a training phase (or calibration phase) when a number of specular objects with known shape (for example, flat shape) are captured by the system and specular pixels in the captured images manually identified. A thresholding value may then be learned by a method of supervised learning.

Returning to FIG. 11, in step 1104, the process proceeds to the next bitplane.

In step 1105, binary images from all bitplanes are combined to obtain a pixel location on the current layer for each camera pixel. In particular, when combining all the binary digits for a given layer, the binary code, and hence the pixel location on the layer, is recovered for each camera pixel. The pixel location corresponds to one of the "intersection points" for the layers, as shown in FIG. 1. By combining the binary digits for all the bitplanes corresponding to the vertical binary coded patterns, we recover the pixel column index i. By combining the binary digits for all the bitplanes corresponding to the horizontal binary coded patterns, we recover the pixel row index j. The indices (i,j) then uniquely identify a pixel location on the current pixel-layer. Thus, in this example, each of the one or more coded patterns transmitted to one or more pixel-layers is a bitplane of a binary code, and the location of a pixel in each of the multiple pixel-layers that is associated with the specular reflection is determined by matching a binarized value of the captured image to a binary code bit value.

When the combining is performed for each layer (step 1106 proceeds to the next layer), the pixel locations from all layers have been determined. In step 1107, it is then possible to determine an incoming illumination direction for each specular reflection/camera pixel by a regression line on the pixel locations.

In particular, for each camera pixel, N pixel locations, or intersection points, (corresponding to N layers) are obtained, which allows to fit a regression line for the incoming illumination direction. In that regard, ordinarily, at least two intersection points are needed to fit a regression line. If N>2, there may be a benefit from angular superresolution and subpixel accuracy. In one embodiment, a regression line is fitted to the N points by minimizing the sum of squared distances of the points from the line.

Thus, in an example according to this embodiment, the image is analyzed to determine the location of a pixel in each of the multiple pixel-layers that is associated with the specular reflection, and a regression line on the pixel locations determines the direction of incoming illumination for the specular reflection.

Then, from the incoming illumination direction and the viewing direction of the camera, it is possible to obtain the depth value of the point on the surface of the object, by triangulation of the direction of incoming illumination and a viewing direction for the specular reflection captured in the image.

In that regard, the viewing direction is not necessarily fixed for a given camera position, but is different for each specular reflection. More specifically, each camera pixel determines a viewing direction and therefore the viewing direction depends on the camera pixel for a particular specular reflection. Thus, for each point on the surface of the object, the viewing direction changes. For example, even in a case where the capturing camera is fixed, the viewing direction of each camera-pixel is not.

Generally, if the incoming illumination direction is represented parametrically by x=p+tu where p is a 3D point, u is a unit vector and t is a free parameter, and similarly the viewing direction is represented parametrically by x=q+sv where q is a 3D point, v is a unit vector and s is a free parameter, then the surface point can be estimated by the method of triangulation as ½(p+q+t₀u+s₀v), where $$w = q - p, t_0 = \frac{u \cdot w - (u \cdot v)(v \cdot w)}{1 - (u \cdot v)^2}, \text{ and } s_0 = \frac{-v \cdot w + (u \cdot v)(u \cdot w)}{1 - (u \cdot v)^2}.$$

The estimated point is the 3D point that is closest to both lines corresponding to the two directions. The depth value of this 3D point is then taken as the depth value of the point on the surface of the object.

Depth value can also be determined by other methods besides triangulation. For example, in one example embodiment, a surface normal vector is estimated for each of a plurality of points on the surface from the direction of incoming illumination for the specular reflection at each point and a viewing direction for the specular reflection captured in the image, and the depth value is determined by determining a surface profile function whose normal derivatives best fit the estimated surface normal vectors. In one example, the surface normal vector is estimated as a bisecting vector between the direction of incoming illumination and the viewing direction.

Figure 13:
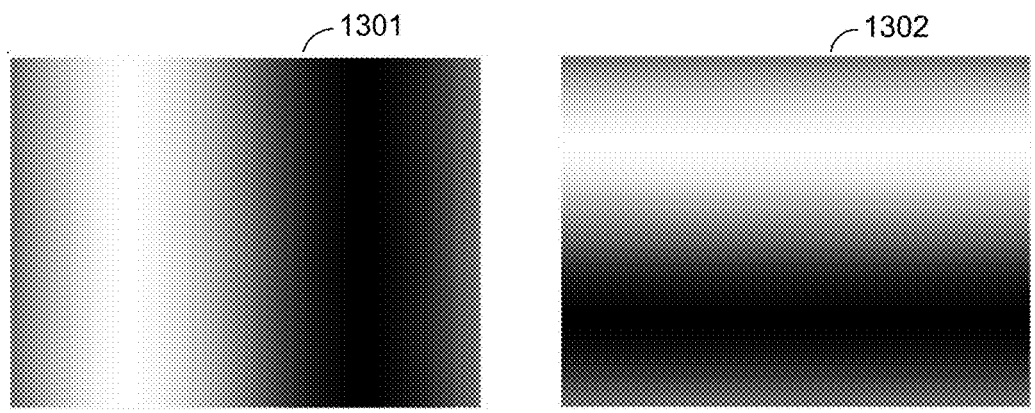
FIG. 13 is a view for explaining example sinusoidal patterns in accordance with an example embodiment.

In a different example embodiment, the coded patterns are not binary. Instead, phase-shifted sinusoidal patterns are transmitted to the layers, such as patterns 1301 and 1302 shown in FIG. 13. Thus, in this example embodiment, each of the one or more coded patterns is phase-shifted relative to a sinusoidal pattern, and the location of a pixel in each of the multiple pixel-layers that is associated with the specular reflection is obtained by recovering a phase angle associated with the pixel from the captured image.

In one example, at least 3 different phase shifts are used for each of the horizontal and vertical directions, resulting in at least 6 coded patterns. In order to display and capture these coded patterns, a pixel-layer capable of displaying HDR images and a camera of high sensitivity (e.g., an HDR camera) can be used. The at least 3 patterns for each direction are used to recover the phase angle associated with a pixel. For example, for a layer with pixel resolution $r_x \times r_y$, a pixel with coordinates (x,y), $0 \leq x < r_x, 0 \leq y < r_y$, may be associated with phase angles $\phi_x = 2\pi x/r_x$, $\phi_y = 2\pi y/r_y$. Correct recovery of these phase angles by capturing sufficiently many images will then give the location of the pixel.

Figure 14:
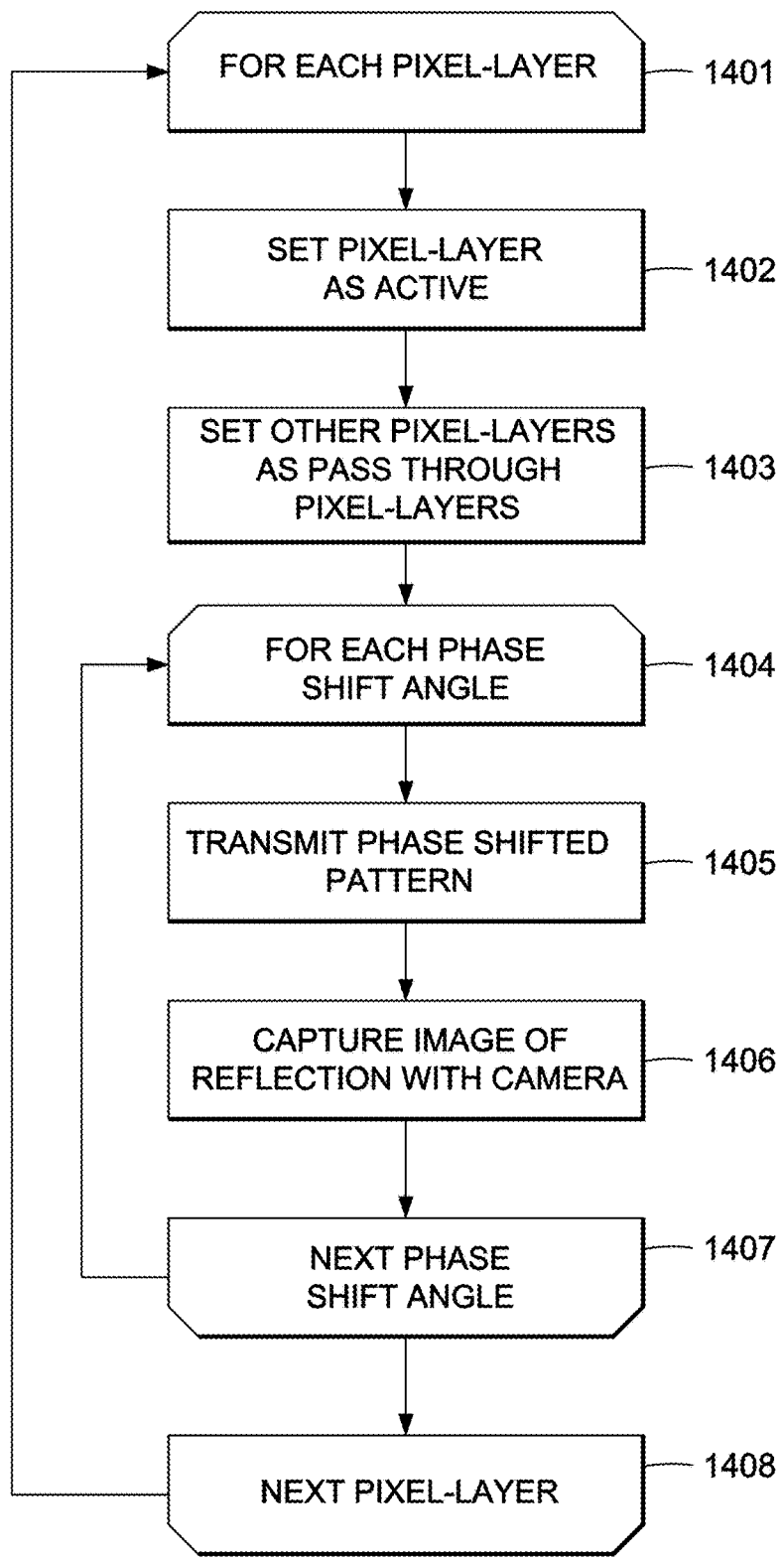
FIG. 14 is a flowchart for illustrating a capture process according to an example embodiment.
Figure 15:
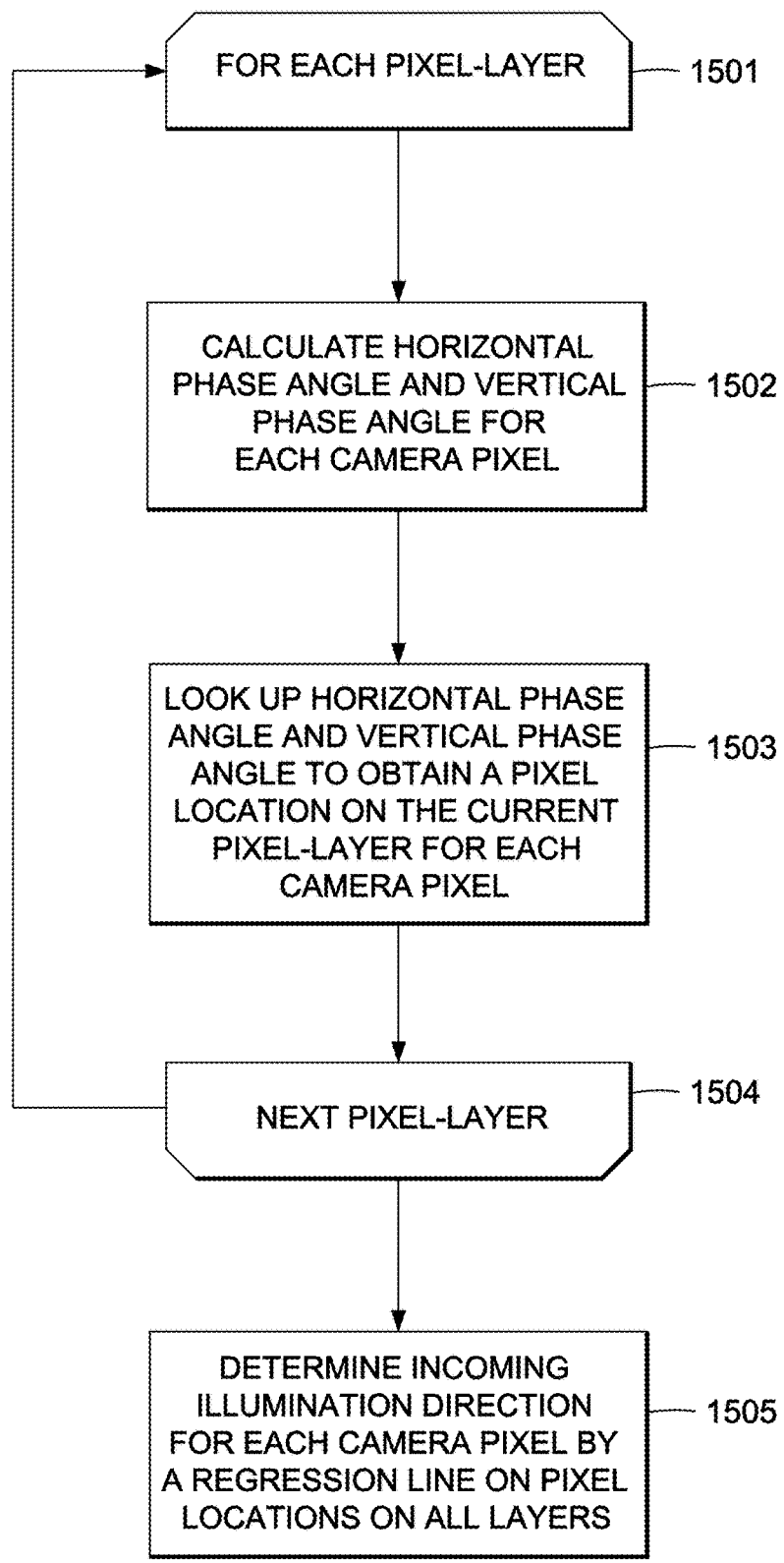
FIG. 15 is a flowchart for illustrating post-processing according to an example embodiment.

FIGS. 14 and 15 are flowcharts illustrating the analogous steps for capture and reconstruction according to this example embodiment.

In particular, FIG. 14 is a flowchart for illustrating a capture process according to this example embodiment.

In step 1401, a process is initiated for each layer. In step 1402, the current layer is set as active, and in step 1403, the other layers are set as pass-through layers. A sub-process is initiated in step 1404 for each phase shift angle. Specifically, in step 1405, for the current phase shift angle, a phase-shifted pattern is transmitted, and an image of the reflection is captured with a camera (or capture device, e.g., capture device 102) in step 1406. The process proceeds to the next phase shift angle in step 1407, and when all phase shift angles are done, the process proceeds to the next layer in step 1408.

FIG. 15 is a flowchart for illustrating post-processing according to the example embodiment.

In step 1501, a process begins for the current layer.

In step 1502, the horizontal phase angle (resp. vertical phase angle) for each camera pixel is calculated from a set of captured images corresponding to the horizontal phase-shifted patterns (resp. vertical phase-shifted patterns). For example, if 3 sinusoidal patterns are used for phase shift angles −120°, 0° and 120° in each of the horizontal and vertical directions, and $I_{1x}, I_{2x}, I_{3x}$ (resp. $I_{1y}, I_{2y}, I_{3y}$) are the captured images for the horizontal (resp. vertical) direction, then $$\phi_x = \tan^{-1}\left(\frac{\sqrt{3} \cdot (2I_{2x} - I_{1x} - I_{2x})}{I_{3x} - I_{1x}}\right), \phi_y = \tan^{-1}\left(\frac{\sqrt{3} \cdot (2I_{2y} - I_{1y} - I_{2y})}{I_{3y} - I_{1y}}\right).$$

Other variants of phase shifting, such as more than 3 phase shift angles, or using a cosine pattern instead of sine, or using even non-sinusoidal periodic patterns, are within the scope of this embodiment.

In step 1503, the horizontal phase angle and vertical phase angle are looked up to obtain a pixel location on the current layer for each camera pixel. In particular, the pixel locations (x,y) may be recovered as $$x = \left[\frac{\phi_x}{2\pi}r_x\right] \text{ and } y = \left[\frac{\phi_y}{2\pi}r_y\right].$$

In step 1504, the process proceeds to the next layer.

In step 1505, since the pixel locations from all layers have been determined, it is possible to determine an incoming illumination direction for each specular reflection/camera pixel by a regression line on the pixel locations. From the incoming illumination direction and the viewing direction of the camera, it is possible to obtain a surface profile or depth value(s), as discussed above.

In still another example embodiment, the pixels are capable of displaying color and the camera is capable of recording colors. In such an embodiment, instead of displaying one coded pattern a time on an active layer, a pattern is displayed on each layer simultaneously. For example, more than one pixel-layers with respective associated colors are active simultaneously and receive transmission of a coded pattern. In other words, there is not a notion of active layer, as there is in a monochrome embodiment.

In particular, in this embodiment, each pixel-layer is associated with a color, and each pixel is capable of at least two states of which one state corresponds to a white color and the other state corresponds to a color complementary to the associated color of the pixel-layer to which the pixel belongs, and the transmitted coded pattern for the pixel-layer corresponds to a binary coded pattern in the at least two states. In one example aspect, the associated colors for the pixel-layers are mutually relatively distinct, and the captured image is in multiple color channels each corresponding to a respective associated color for a pixel-layer.

An embodiment of a pixel-layer capable of displaying color, or color pixel-layer, is an RGB LCD panel. In such an embodiment, each pixel has a subpixel structure consisting of RGB color filters.

Figure 16:
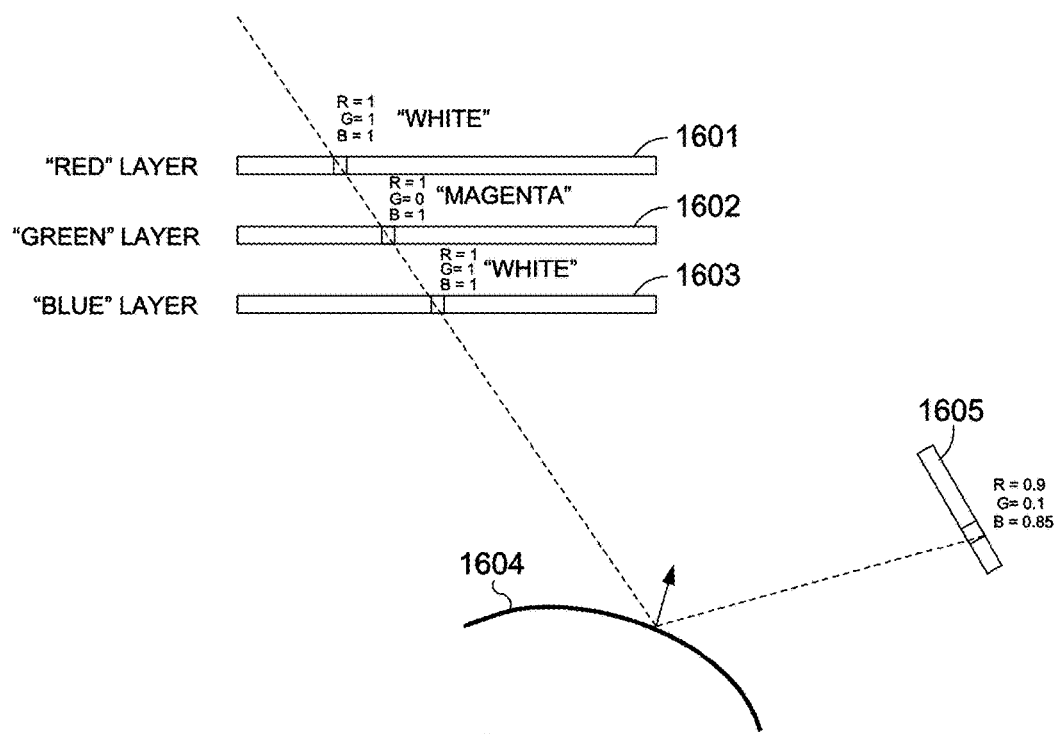
FIG. 16 is a view for explaining illumination and image capture according to an example embodiment.

FIG. 16 is a view for explaining image capture according to this example embodiment.

In general, consider pixels capable of displaying C colors. Although theoretically each pixel is capable of $2^C$ states, in this example only two of these states are used for each layer. Instead, each layer is associated with a color. FIG. 16 depicts embodiment of N=3 layers, where the layers have been associated with "red", "green" and "blue". For the red layer 1601, each pixel has 2 states, "white" and "cyan" (complementary color to red). Similarly, for the green layer 1602, each pixel has 2 states, "white" and "magenta" (complementary color to green) and for the blue layer 1603, each pixel has 2 states, "white" and "yellow" (complementary color to blue). The layers illuminate an object 1604, and a reflection is captured by RGB camera 1605.

As shown in FIG. 16, the binary code is 1 for the pixel in question on the red layer 1601, 0 for the pixel in question on the green layer 1602, and 1 for the pixel in question on the blue layer 1603. Binary coded patterns are displayed on all layers at the same time, and the RGB camera 1605 records a reading of R=0.9, G=0.1, B=0.85 for this specular reflection.

Figure 17:
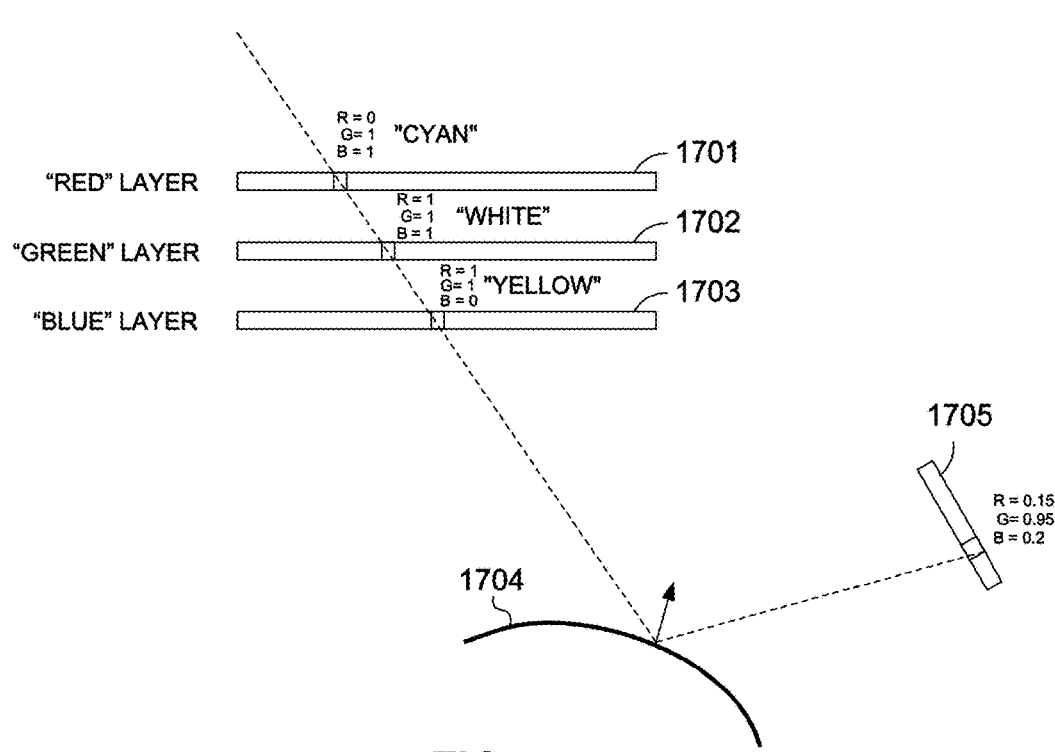
FIG. 17 is a view for explaining illumination and image capture according to an example embodiment.

In one of the embodiments, the code in FIG. 16 is considered "direct code" (in the same sense as in a previous embodiment), and another inverse code is displayed, as shown in FIG. 17.

Thus, in FIG. 17, the pixel in question on the red layer 1701 has state "cyan", the pixel in question on the green layer 1702 has state "white" and the pixel in question on the blue layer 1703 has state "yellow". The layers illuminate an object 1704, and a reflection is captured by RGB camera 1705.

In FIG. 17, only color bits corresponding to the color of the layers are inverted. For example, for the same pixel on the red layer, the "direct color binary coded pattern" in FIG. 16 has the color value R=1, G=1, B=1, whereas the "inverse color binary coded pattern" in FIG. 17 has the color value R=0, G=1, B=1. Only the color bit in the red channel is inverted because the pixel is on the red layer. In this example, the RGB camera 1705 records a reading of R=0.15, G=0.95, B=0.2. A comparison with the readings from the direct code gives the recovered binary codes as 1 on the red layer, 0 on the green layer, and 1 on the blue layer.

Assuming C color pixel-layers, each layer is associated with one of C mutually relatively distinct colors, and the camera is capable of capturing in the corresponding C color channels, each layer has pixel resolution $r_x \times r_y$, so that integers $M_x$ and $M_y$ are chosen to satisfy $2^{M_x} \geq r_x$ and $2^{M_y} \geq r_y$, and using direct and inverse binary coded patterns, the number of required captured images is $2(M_x+M_y)$. The number of required captured images is independent of C, the number of layers.

Figure 18:
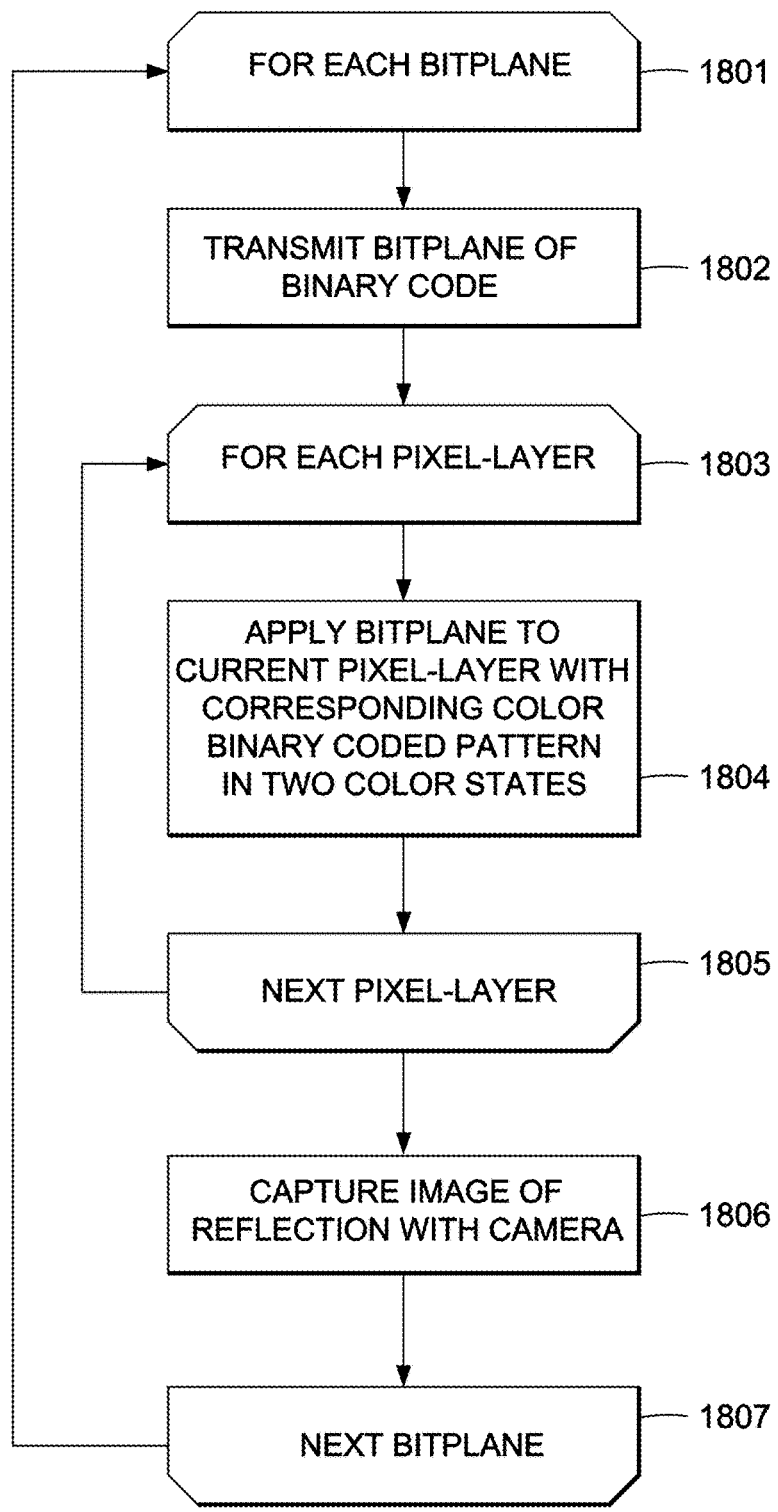
FIG. 18 is a flowchart for illustrating a capture process according to an example embodiment.

FIG. 18 is a flowchart for illustrating a capture process according to this example embodiment.

In step 1801, a process is initiated for each bitplane. In step 1802, a bitplane of binary coded pattern is transmitted. In step 1803, a sub-process is initiated for each color pixel-layer. In step 1804, the transmitted bitplane is applied to the current color pixel-layer with a corresponding color binary coded pattern in the two color states for the current layer, and in step 1805, the process proceeds to the next layer. In step 1806, an image of the reflection is captured with a camera (or capture device, e.g., capture device 102) in step 1406. The process proceeds to the next bitplane in step 1407.

Figure 19:
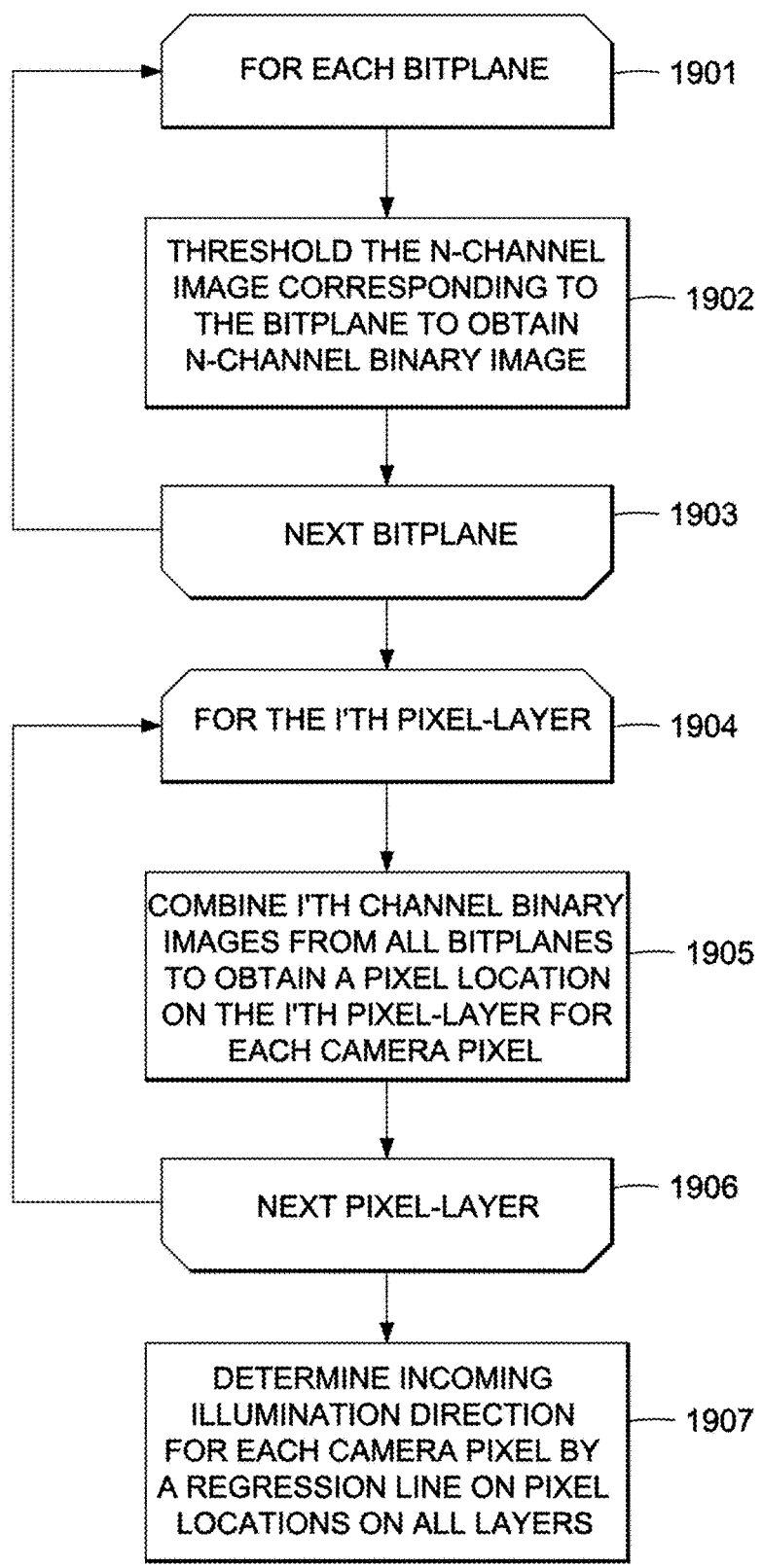
FIG. 19 is a flowchart for illustrating post-processing according to an example embodiment.

FIG. 19 is a flowchart for illustrating post-processing according to the above example embodiment.

In step 1901, a process is initiated for each bitplane. In step 1902, the N-channel image corresponding to the bitplane is thresholded, to obtain an N-channel binary image (the thresholding may be performed similarly to step 1103 as described in relation to FIG. 11), and in step 1903, the process proceeds to the next bitplane.

In step 1904, a process is initiated for the $I^{th}$ layer (e.g., a current layer). Specifically, in step 1905, the binary images from all bitplanes in the $I^{th}$ channel are combined to obtain a pixel location on the $I^{th}$ layer for each camera pixel. In step 1906, the process proceeds to the next layer.

In step 1907, since the pixel locations from all layers have been determined, it is possible to determine an incoming illumination direction for each specular reflection/camera pixel by a regression line on the pixel locations, for example as discussed above with respect to FIG. 11.

In still another example embodiment, it is possible to use non-binary coded patterns with color pixel-layers. Again, all layers are "active" when displaying the coded patterns. In the example of 3 phase shift angles, the required number of captured images is 6.

In addition, and in particular with color pixel-layers, it is also possible to combine different patterns from different bitplanes and different layers. Depending on how the different patterns are combined, the notion of "active layer" may not be applicable, e.g., if patterns from different layers are combined. In general, the required number of captured images is $\lceil P/C \rceil$, where P is the number of coded patterns. For a binary coded pattern embodiment with direct and inverse patterns, $P=2(M_x+M_y)N$. For the phase shifting coded pattern embodiment with K phase shift angles, $P=2KN$.

All of the example embodiments above (e.g., with respect to FIGS. 8 to 19), lead to a determination of an incoming illumination direction field, as described above.

As also mentioned above, for one embodiment, for each camera pixel (viewing direction), the incoming illumination direction is used to triangulate with the viewing direction to recover the depth value of a point on the surface of the object.

In another embodiment described above, a surface normal vector is estimated for each of a plurality of points on the surface from the direction of incoming illumination for the specular reflection at each point and a viewing direction for the specular reflection captured in the image, and the depth value is determined by determining a surface profile function whose normal derivatives best fit the estimated surface normal vectors. In one example, the surface normal vector is estimated as a bisecting vector between the direction of incoming illumination and the viewing direction.

Additional physical arrangements for image capture will now be described with respect to FIGS. 20 to 22.

For a fixed camera, the number of camera pixels receiving specular reflections may be increased by maximizing the enclosure of the specular object with pixel-layers. Put another way, for a fixed camera, some camera pixel may not receive specular reflections because there is no corresponding illuminating pixels. Thus, more pixel-layer assemblies, or different geometry of the pixel-layer assemblies may be used to obtain a better chance of obtaining specular reflections.

Figure 20:
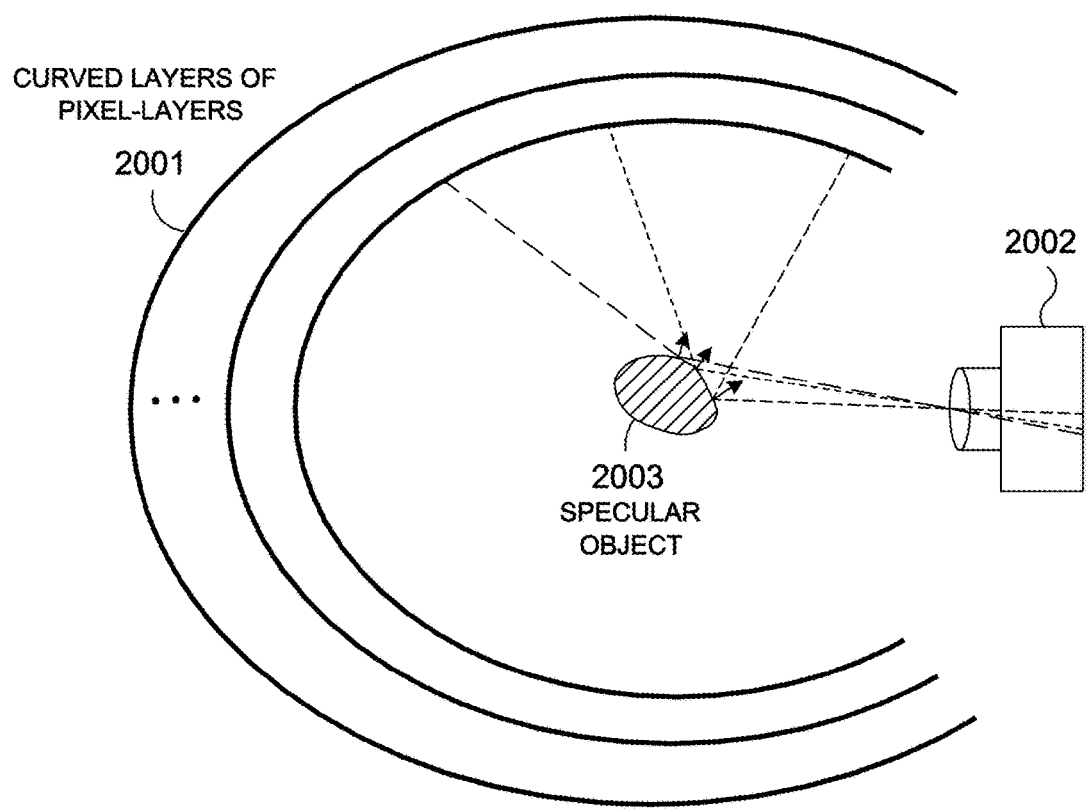
FIG. 20 is a view illustrating an arrangement for image capture according to an example embodiment.

One embodiment uses multiple pixel-layers which are curved so as to surround the object, as shown in FIG. 20. In particular, FIG. 20 depicts curved pixel-layers 2001, a capture device 2002, and a specular object 2003.

It should be noted that every embodiment disclosed above can be used on curved layers.

In still other embodiments, multiple pixel-layers are organized in a plurality of groups, each group of which comprising multiple pixel-layers and illuminating the object in a respectively different direction.

Figure 21:
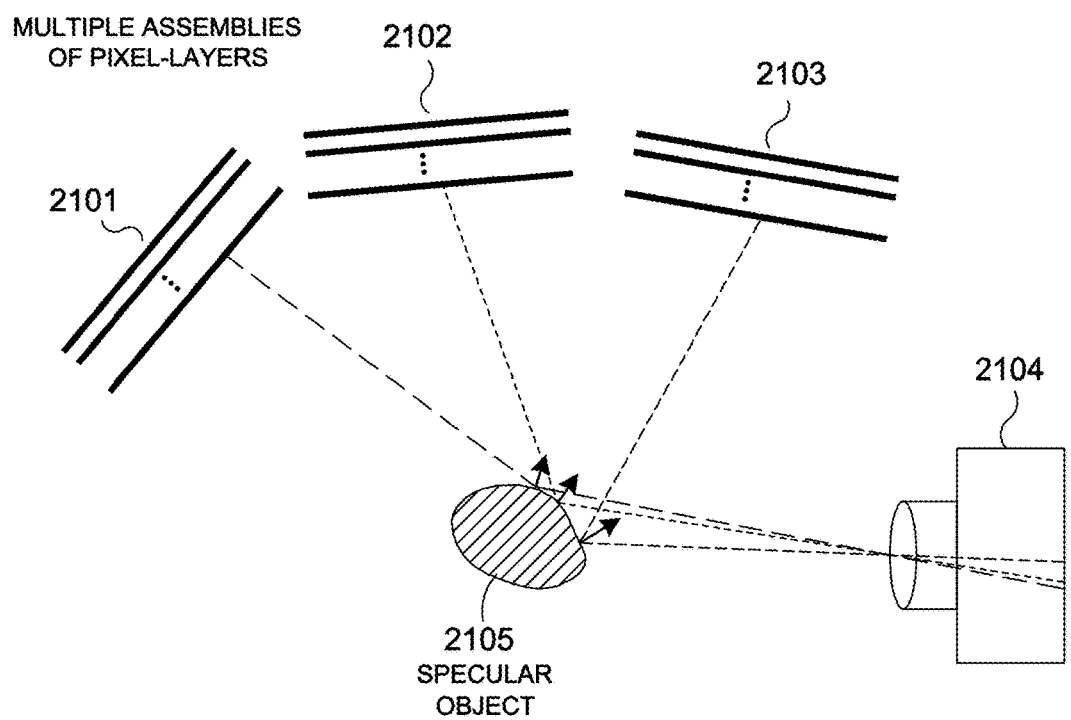
FIG. 21 is a view illustrating an arrangement for image capture according to an example embodiment.

For example, one embodiment is to have plural groups of multiple layers which are arranged so as to surround the specular object, as shown in FIG. 21. Thus, FIG. 21 depicts multiple assemblies of pixel-layers, specifically assembly 2101, assembly 2102 and assembly 2103, along with capture device 2104 and specular object 2105.

For layers of monochrome pixels, each layer of the plurality of pixel-layers becomes the active layer in turn, in a temporally sequential manner. If the layers of the plurality of layers have relatively distinct colors, and the camera is a multispectral camera capable of capturing in the relatively distinct color channels, then it is possible to display all layers simultaneously. There are other "in-between" scenarios, e.g., when each assembly consists of layers with distinct colors whereas colors are not distinct between the assemblies, such as the case of identical assemblies, in which case layers within an assembly can be displayed simultaneously, while each assembly becomes "active" in turn, in a temporally sequential manner.

Figure 22:
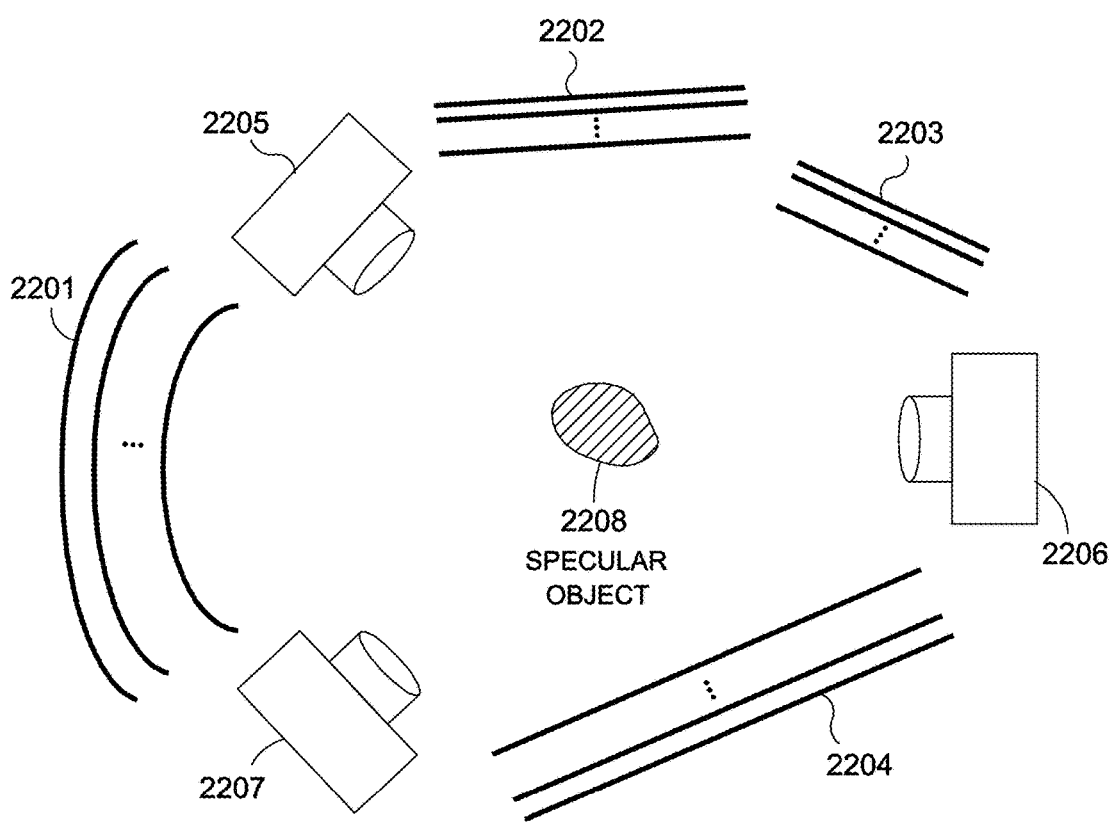
FIG. 22 is a view illustrating an arrangement for image capture according to an example embodiment.

Another example involves multiple cameras and a multiple assemblies of pixel-layers, as shown in FIG. 22. Thus, a plurality of images are captured in a respective plurality of different viewing directions. Multiple cameras allow depth maps in multiple viewpoints. In one embodiment, all the cameras perform capture simultaneously.

Thus, as shown in FIG. 22, assemblies 2201, 2202, 2203, and 2204 and cameras 2205, 2206 and 2207 surround specular object 2208.

Of course, FIG. 22 shows one example configuration, but other similar configurations with more than three cameras in other positions and/or different combinations and positions of pixel-layers are possible.

<Other Embodiments>

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a non-volatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for measurement of a depth value, comprising:
   capturing an image of an object illuminated by one or more light patterns effected by multiple pixel-layers, wherein each pixel-layer includes an array of pixels;
   determining a direction of incoming illumination for a specular reflection at a point on the surface of the object; and
   determining the depth value of the point on the surface of the object based on the captured image and the direction of incoming illumination,
   wherein the one or more light patterns result from one or more coded patterns transmitted to the pixel-layers, and
   wherein each of the one or more coded patterns is a bitplane of a binary code, and wherein the location of a pixel in each of the multiple pixel-layers that is associated with the specular reflection is determined by matching a binarized value of the captured image to a binary code bit value.

2. The method according to claim 1, further comprising analyzing the image to determine the location of a pixel in each of the multiple pixel-layers that is associated with the specular reflection, and wherein a regression line on the pixel locations determines the direction of incoming illumination for the specular reflection.

3. The method according to claim 1, wherein the depth value is determined by triangulation of the direction of incoming illumination and a viewing direction for the specular reflection captured in the image.

4. The method according to claim 1, further comprising estimating a surface normal vector for each of a plurality of points on the surface from the direction of incoming illumination for the specular reflection at each point and a viewing direction for the specular reflection captured in the image, and wherein the depth value is determined by determining a surface profile function whose normal derivatives best fit the estimated surface normal vectors.

5. The method according to claim 4, wherein the surface normal vector is estimated as a bisecting vector between the direction of incoming illumination and the viewing direction.

6. A method for measurement of a depth value, comprising:
   capturing an image of an object illuminated by one or more light patterns effected by multiple pixel-layers, wherein each pixel-layer includes an array of pixels;
   determining a direction of incoming illumination for a specular reflection at a point on the surface of the object; and
   determining the depth value of the point on the surface of the object based on the captured image and the direction of incoming illumination,
   wherein the one or more light patterns result from one or more coded patterns transmitted to the pixel-layers, and
   wherein each of the one or more coded patterns is phase-shifted relative to a sinusoidal pattern, and wherein the location of a pixel in each of the multiple pixel-layers that is associated with the specular reflection is obtained by recovering a phase angle associated with the pixel from the captured image.

7. The method according to claim 1, wherein each pixel-layer is associated with a color, wherein each pixel is capable of at least two states of which one state corresponds to a white color and the other state corresponds to a color complementary to the associated color of the pixel-layer to which the pixel belongs, and wherein the transmitted coded pattern for the pixel-layer corresponds to a binary coded pattern in the at least two states.

8. The method according to claim 7, wherein the associated colors for the pixel-layers are mutually relatively distinct, and the captured image is in multiple color channels each corresponding to a respective associated color for a pixel-layer.

9. A method for measurement of a depth value, comprising:
   capturing an image of an object illuminated by one or more light patterns effected by multiple pixel-layers, wherein each pixel-layer includes an array of pixels;
   determining a direction of incoming illumination for a specular reflection at a point on the surface of the object; and
   determining the depth value of the point on the surface of the object based on the captured image and the direction of incoming illumination,
   wherein the one or more light patterns result from one or more coded patterns transmitted to the pixel-layers, and
   wherein more than one coded patterns are transmitted to the multiple pixel-layers sequentially and the corresponding more than one images in a same viewing direction are captured in synchronization with the sequential transmission.

10. The method according to claim 1, wherein each pixel-layer successively becomes an active layer to receive a transmission of a coded pattern.

11. The method according to claim 1, wherein multiple pixel-layers are organized in a plurality of groups, each group of which comprises multiple pixel-layers and illuminates the object in a respectively different direction.

12. The method according to claim 1, wherein a plurality of images are captured in a respective plurality of different viewing directions.

13. The method according to claim 1, wherein at least one pixel-layer comprises a spatial light modulator.

14. The method according to claim 1, wherein at least one pixel-layer comprises a semi-transparent sheet.

15. A method for measurement of a depth value, comprising:
   capturing an image of an object illuminated by one or more light patterns effected by multiple pixel-layers, wherein each pixel-layer includes an array of pixels;
   determining a direction of incoming illumination for a specular reflection at a point on the surface of the object; and
   determining the depth value of the point on the surface of the object based on the captured image and the direction of incoming illumination,
   wherein the one or more light patterns result from one or more coded patterns transmitted to the pixel-layers, and wherein the method further comprises:
   designating a pixel-layer as an active layer;
   transmitting a coded pattern of spatially varying pixel values to the active layer; and
   transmitting a constant pattern of spatially non-varying pixel values to the pixel-layers that are not the active layer.

16. The method according to claim 7, wherein more than one pixel-layers with respective associated colors are active simultaneously and receive transmission of a coded pattern.

17. The method according to claim 1, wherein the multiple pixel-layers are curved so as to surround the object.

18. The method according to claim 11, wherein the plural groups of multiple pixel-layers are arranged so as to surround the object.

* * * * *